(12) United States Patent
Henrion

(10) Patent No.: US 7,290,062 B2
(45) Date of Patent: Oct. 30, 2007

(54) METHOD FOR MUTUAL TRANSFERS OF CONTROL PARAMETERS THROUGH A COMMUNICATIONS NETWORK

(75) Inventor: Michel Henrion, Boulogne-Billancourt (FR)

(73) Assignee: Alcatel, Paris (FR)

( * ) Notice: Subject to any disclaimer, the term of this patent is extended or adjusted under 35 U.S.C. 154(b) by 761 days.

(21) Appl. No.: 10/276,253

(22) PCT Filed: May 21, 2001

(86) PCT No.: PCT/FR01/01555

§ 371 (c)(1),
(2), (4) Date: Nov. 15, 2002

(87) PCT Pub. No.: WO01/91405

PCT Pub. Date: Nov. 29, 2001

(65) Prior Publication Data

US 2004/0024895 A1 Feb. 5, 2004

(30) Foreign Application Priority Data

May 25, 2000 (FR) .................................. 00 06696

(51) Int. Cl.
G06F 15/16 (2006.01)
G06F 15/173 (2006.01)

(52) U.S. Cl. ..................... 709/246; 709/204; 709/228; 709/238

(58) Field of Classification Search ........ 709/208–211, 709/220–222, 227–230, 231, 204–207, 238, 709/246–247; 370/473
See application file for complete search history.

(56) References Cited

U.S. PATENT DOCUMENTS

| | | | | |
|---|---|---|---|---|
| 5,164,938 | A | * | 11/1992 | Jurkevich et al. ........... 370/231 |
| 5,528,605 | A | * | 6/1996 | Ywoskus et al. ........... 714/749 |
| 5,822,523 | A | * | 10/1998 | Rothschild et al. ......... 709/236 |
| 6,067,567 | A | * | 5/2000 | Bartfai et al. .............. 709/221 |
| 6,321,270 | B1 | * | 11/2001 | Crawley ..................... 709/238 |
| 6,721,334 | B1 | * | 4/2004 | Ketcham .................... 370/473 |
| 6,990,070 | B1 | * | 1/2006 | Aweya et al. ............... 370/230 |

OTHER PUBLICATIONS

Transmission Control Protocol. RFC 793, Sep. 1981, pp. 1-8.*
G.A. Thom, "H.323: the multimedia communications standard for local area networks", IEEE Communications Magazine, vol. 34(12), Dec. 1996, pp. 52-56.*
R. Braden, L. Zhang, S. Berson, S. Herzog, and S. Jamin. RFC 2205: Resource ReSerVation Protocol (RSVP)—version 1 functional specification, Sep. 1997. pp. 1-12.*

(Continued)

Primary Examiner—Glenton B. Burgess
Assistant Examiner—Brendan Y. Higa
(74) Attorney, Agent, or Firm—Sughrue Mion, PLLC

(57) ABSTRACT

A method is provided for mutually transferring control parameters between terminal modules interconnected by a data communications network. "Information" control parameters are transferred from "source" terminal modules to "destination" terminal modules using dedicated information messages; and "response" parameters are optionally transferred in return from the destination terminal modules to the source terminal modules, likewise using dedicated response messages. The mutual transfers of information messages between terminal modules should take place via distributed functions referred to as "distributed intermediate functions" for processing messages. Each of these functions is allocated to a set of destination terminal modules and to a set of source terminal modules.

18 Claims, 11 Drawing Sheets

OTHER PUBLICATIONS

J. C. Bolot et al, "Dynamical Behavior of rate-Based Flow Control Mechanisms[1]", Computer Communications Review, US, Association for Computing Machinery, New York, vol. 20, No. 2, Apr. 1, 1990 pp. 35-49, XP000133726.

S. Pejhan et al, "Refinements to Rate-Based Flow Control with Extensions to Multidrop Applications", GB, London, Chapman and Hall, Apr. 1, 1996, pp. 147-160, XP000702576.

K-H Cho et al, Supervisory Rate-Based Flow Control of ATM Networks for ABR Services, IEICE Transactions on Communications, JP, Institute of Electronics Information and Comm. Eng. Tokyo, vol. E81-B, No. 6, Jun. 1, 1998, pp. 169-1271, XP000788976.

* cited by examiner

FIG_1
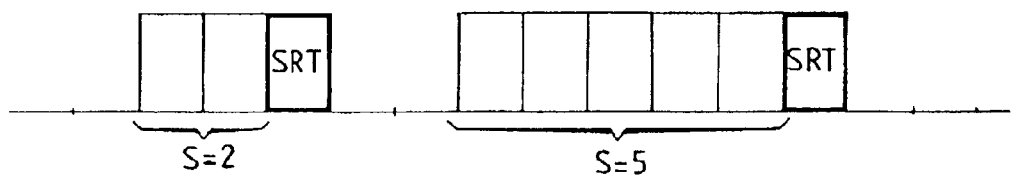
FIG_5
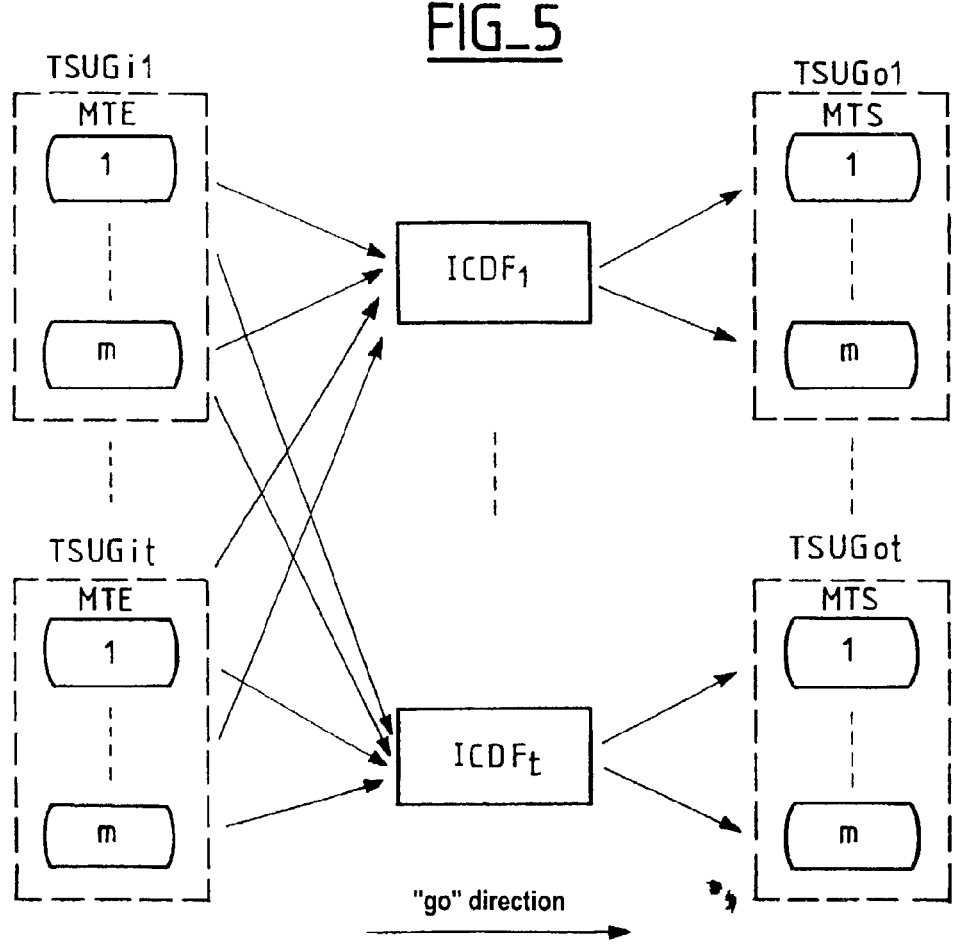

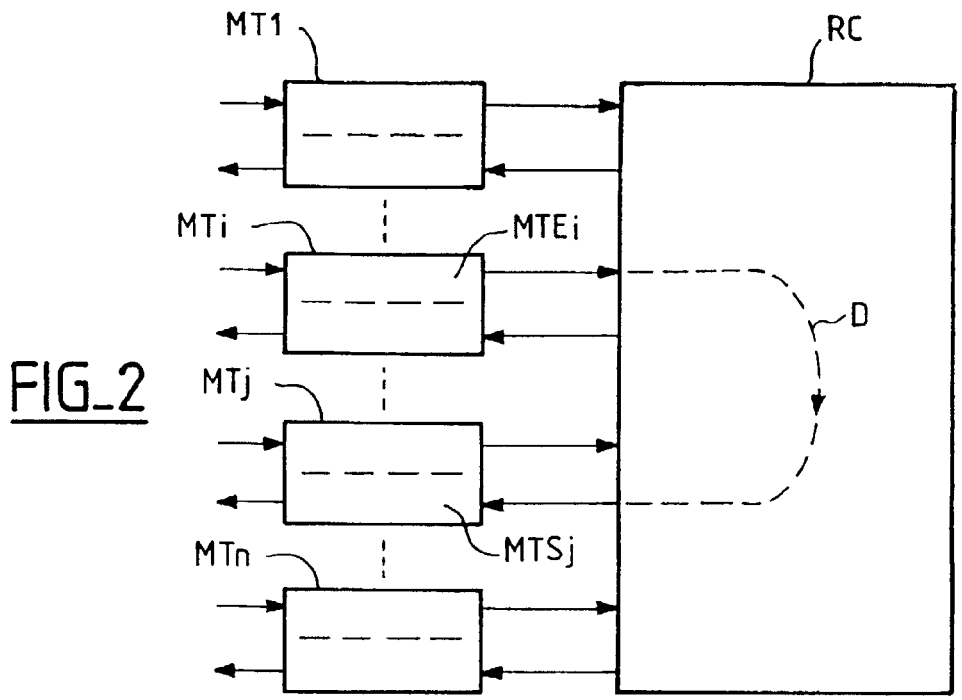
FIG_2
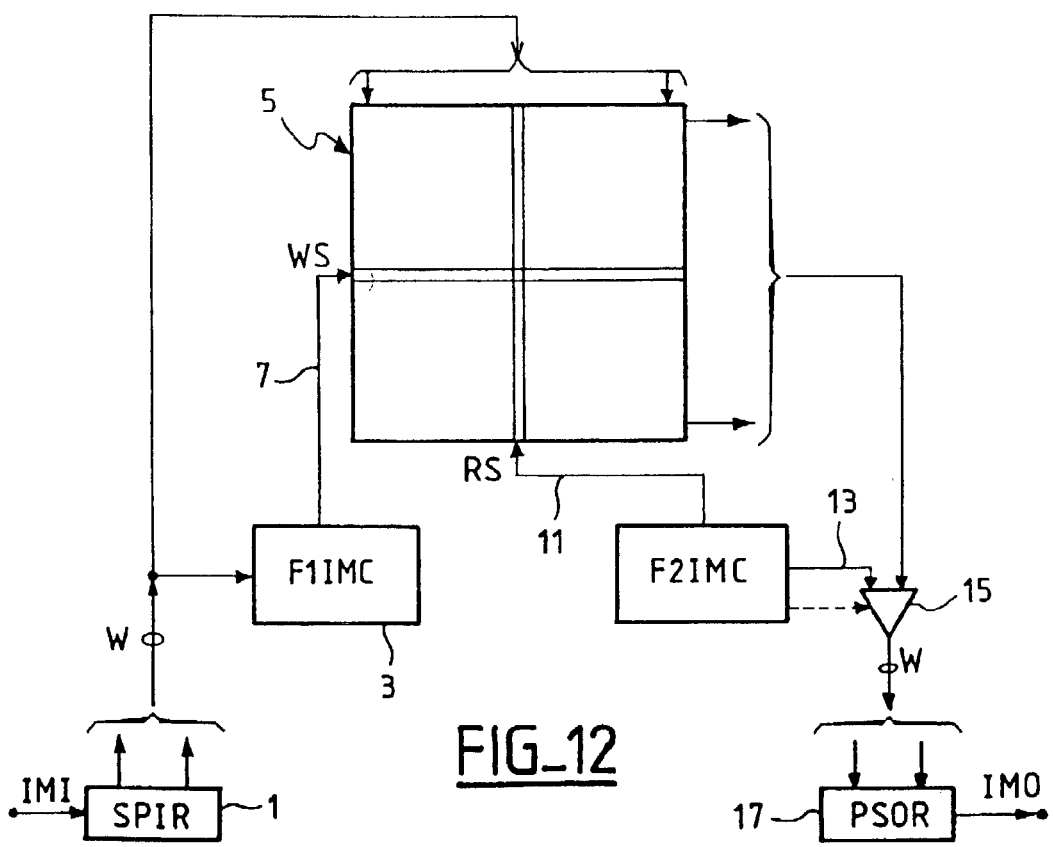
FIG_12

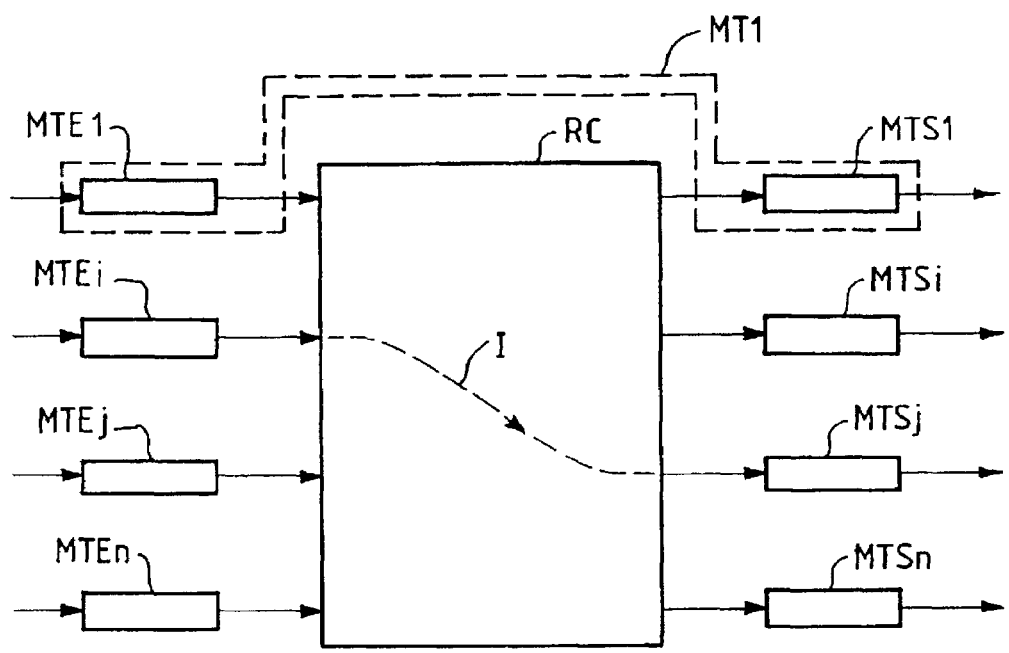
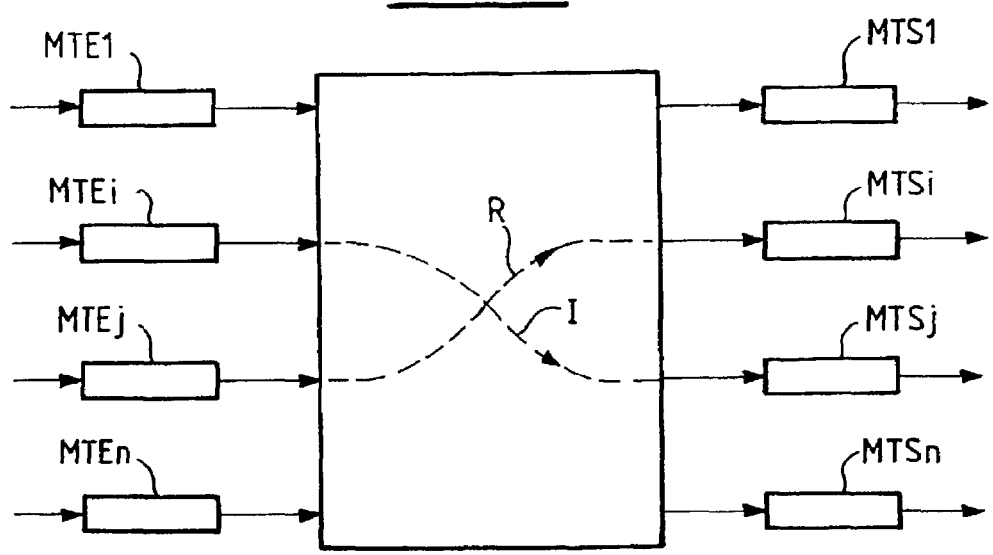

FIG_4
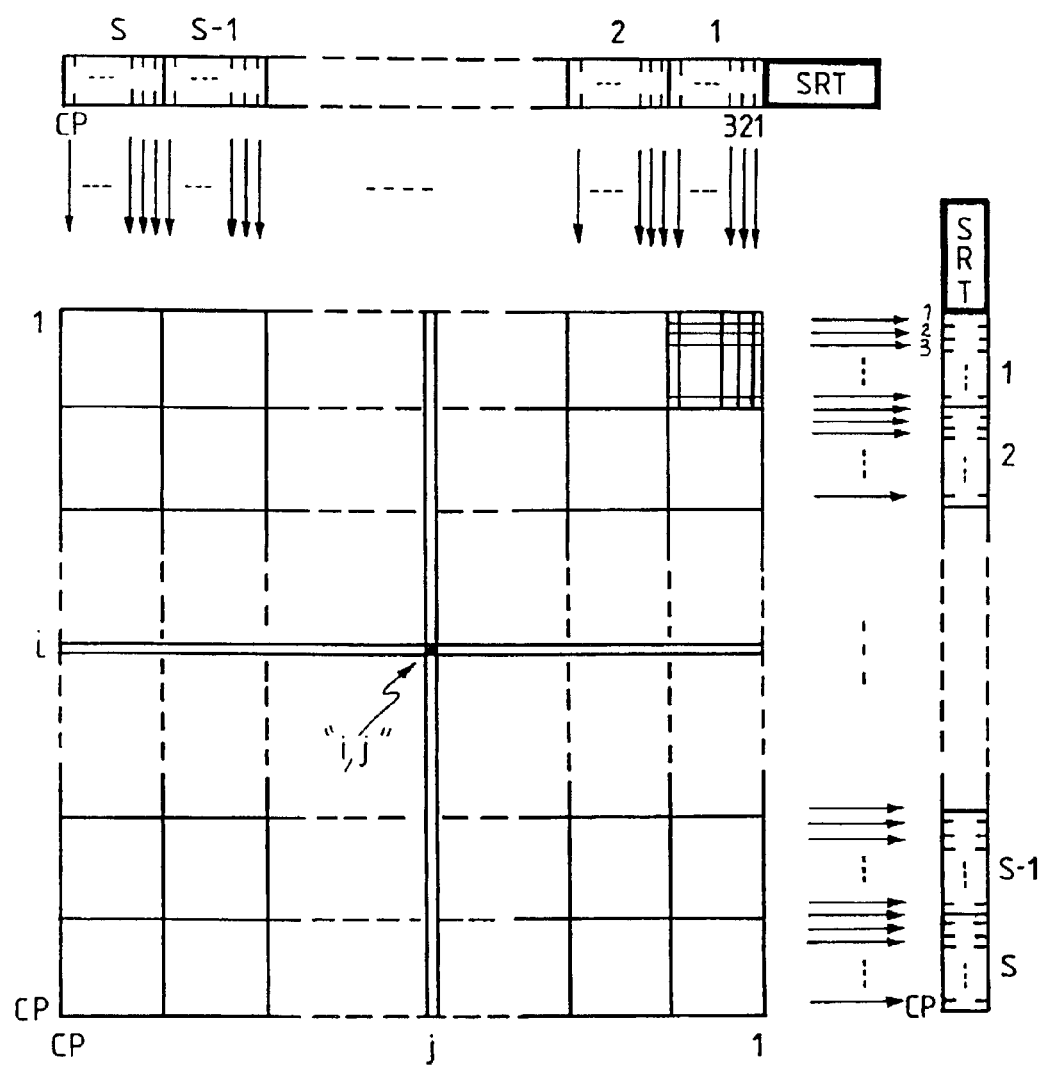

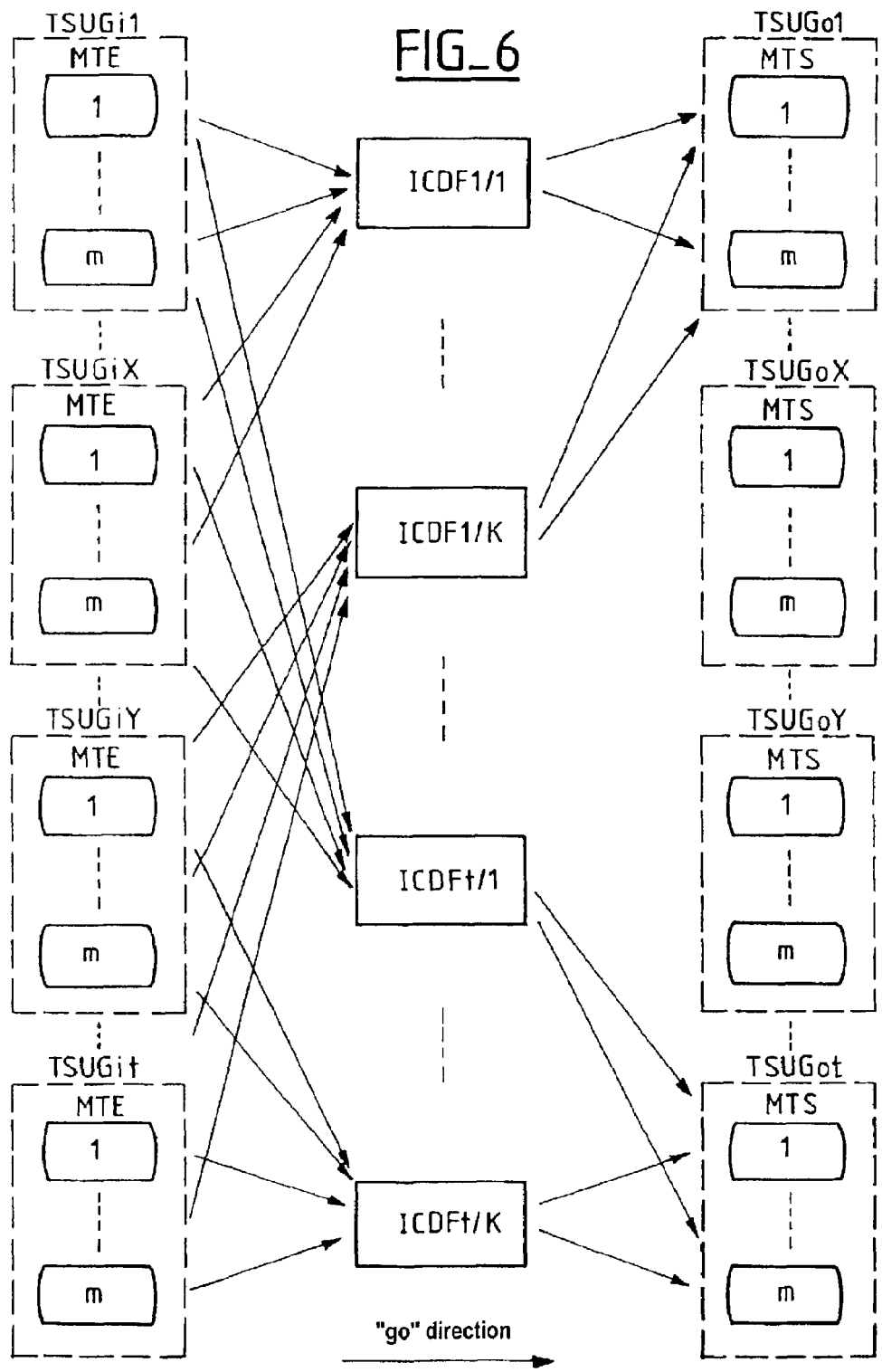

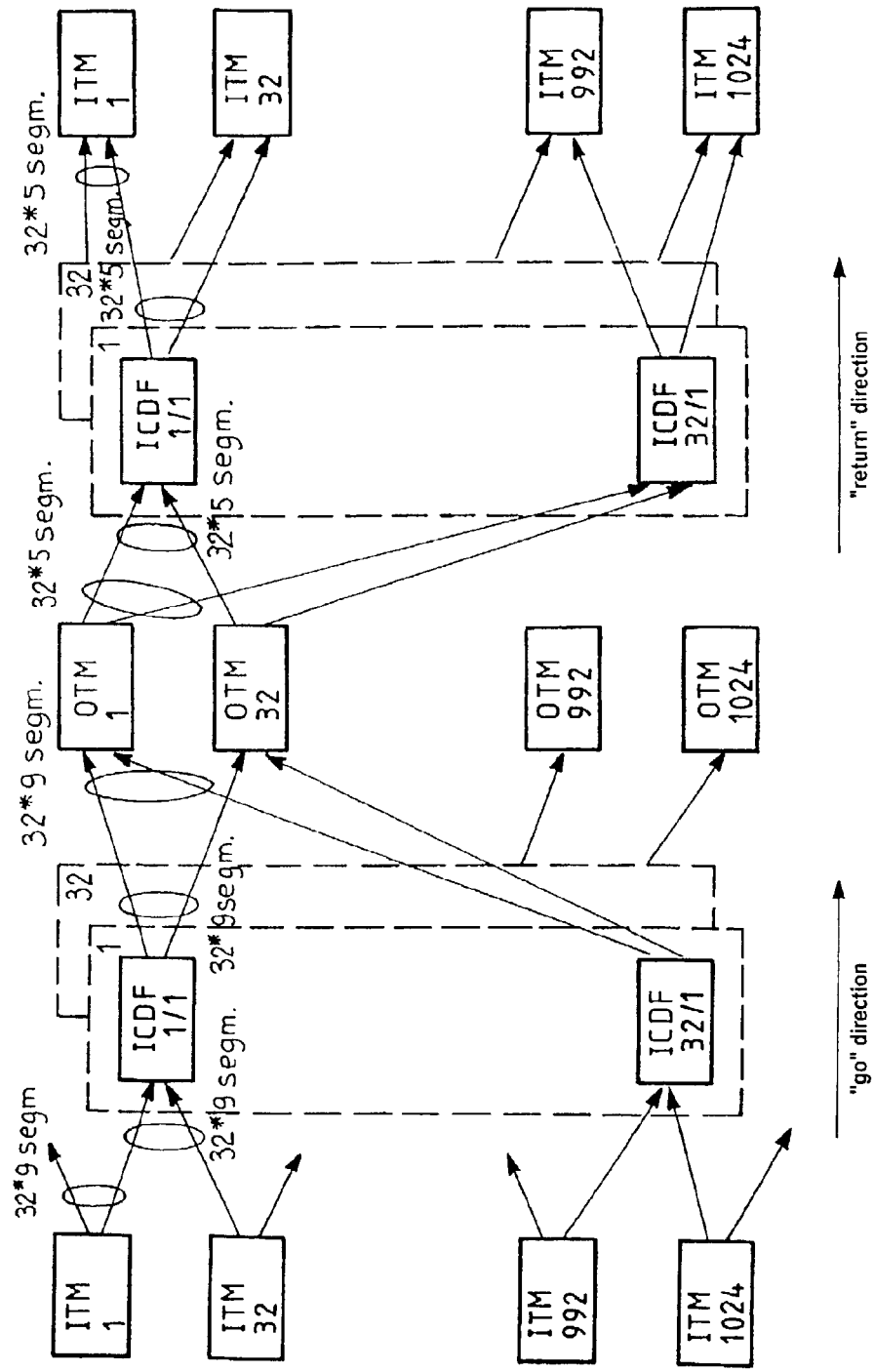
FIG_7

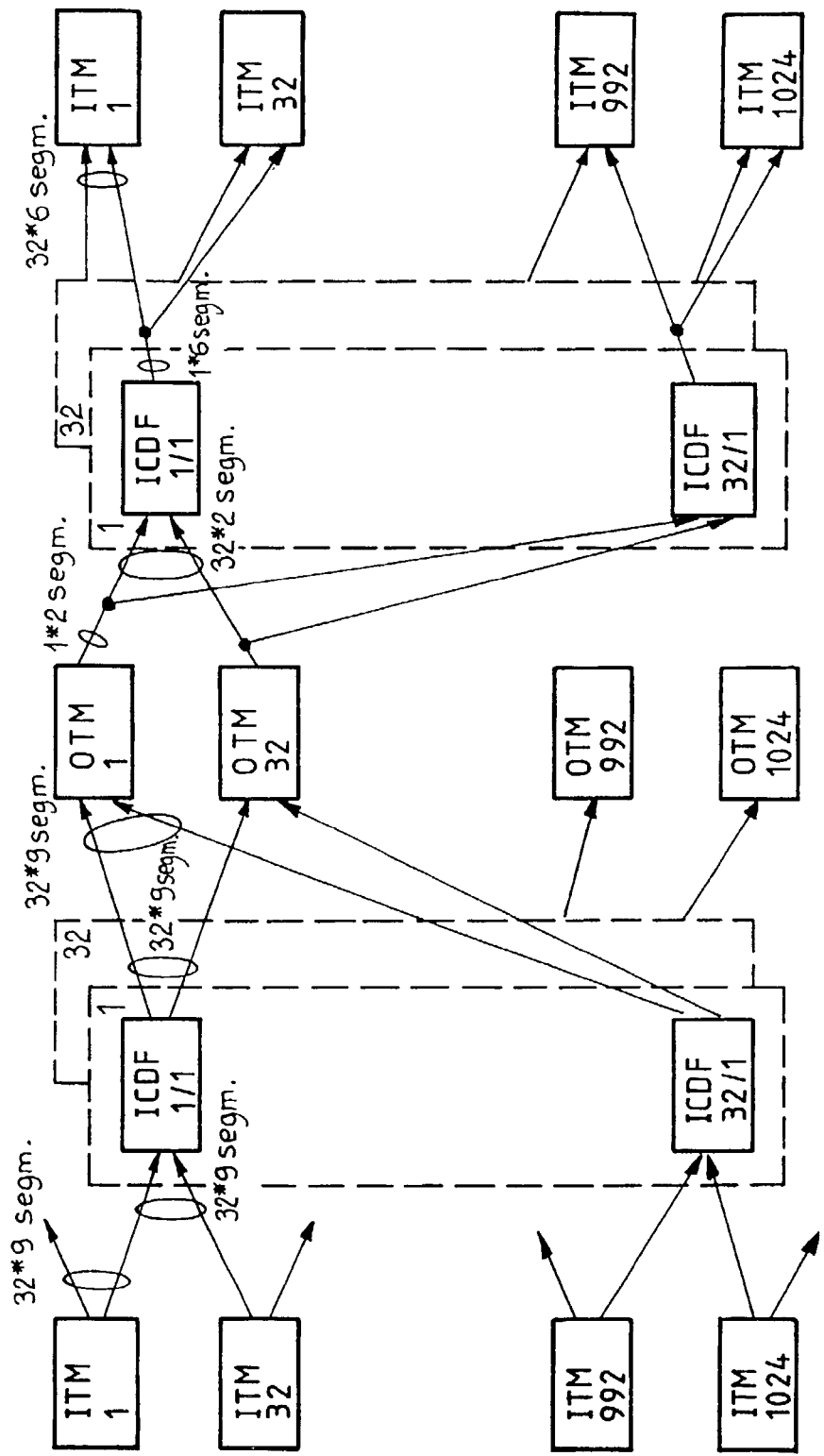
FIG_8

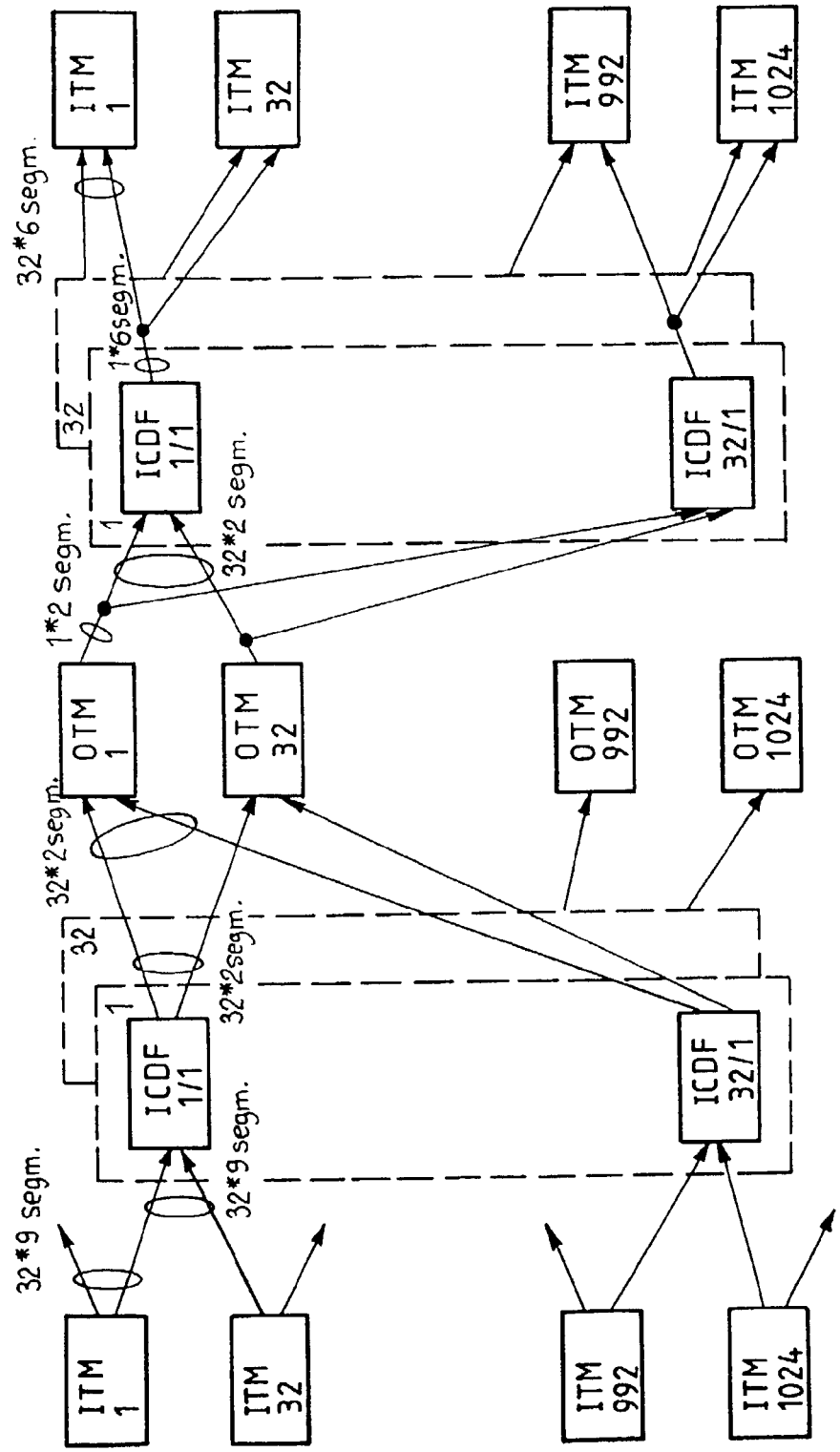
FIG_9

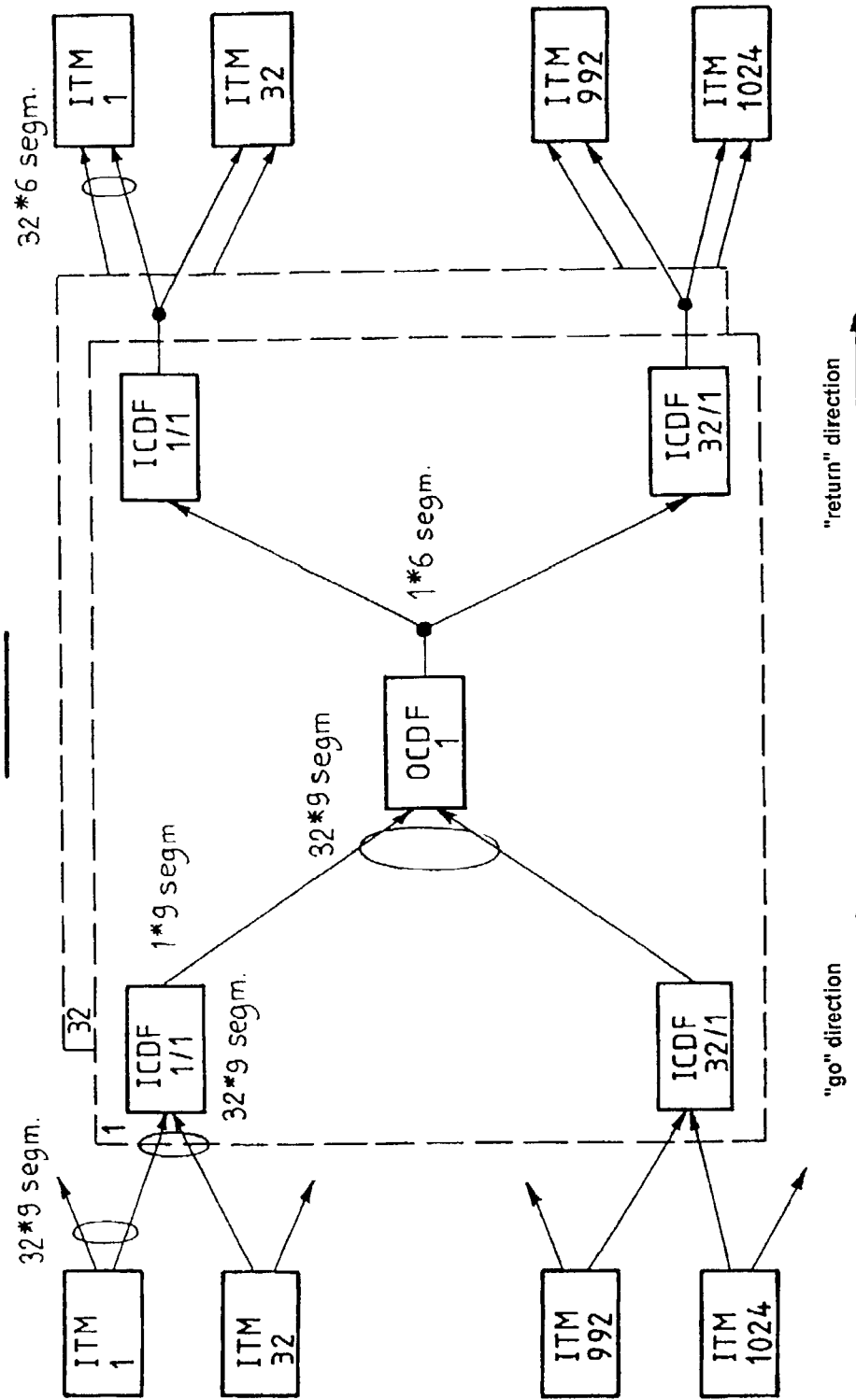

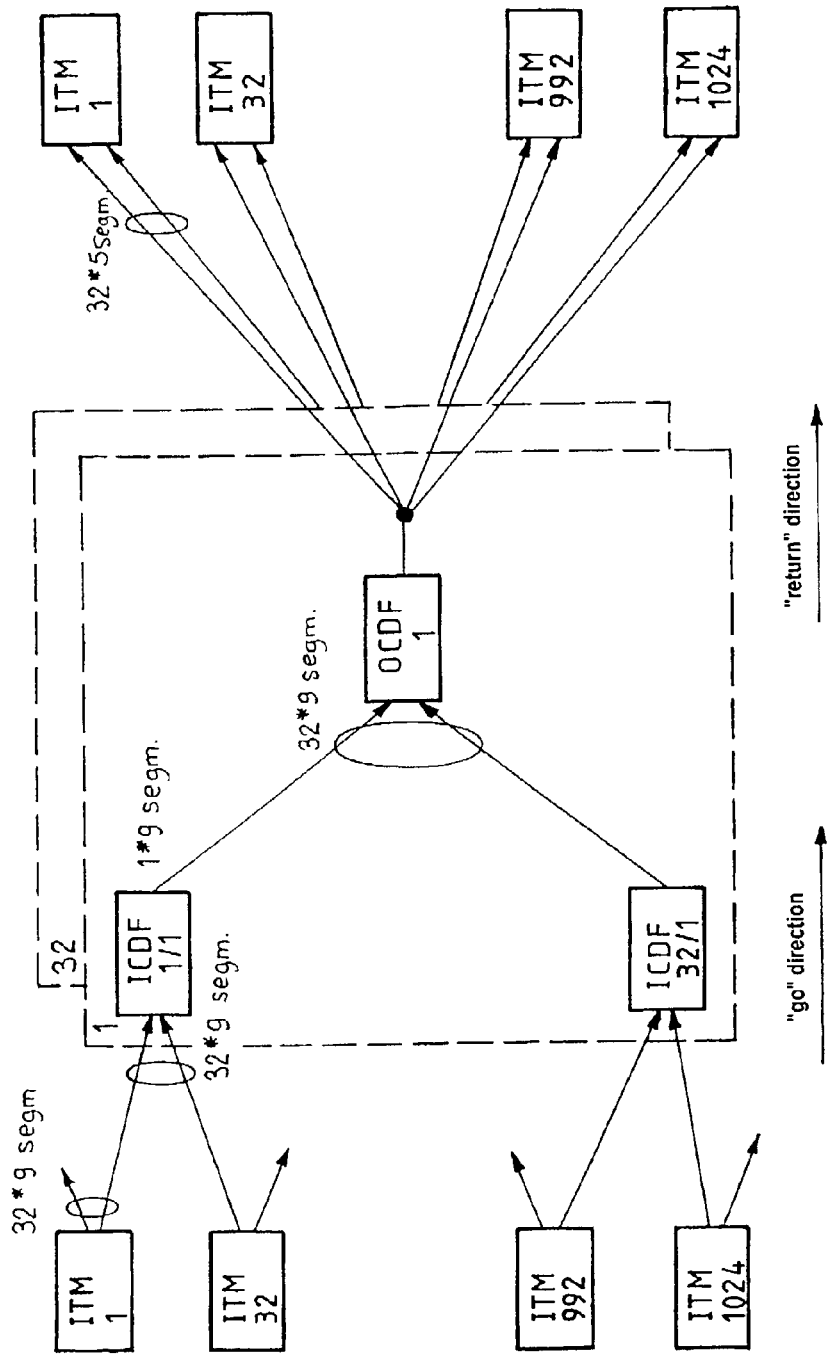

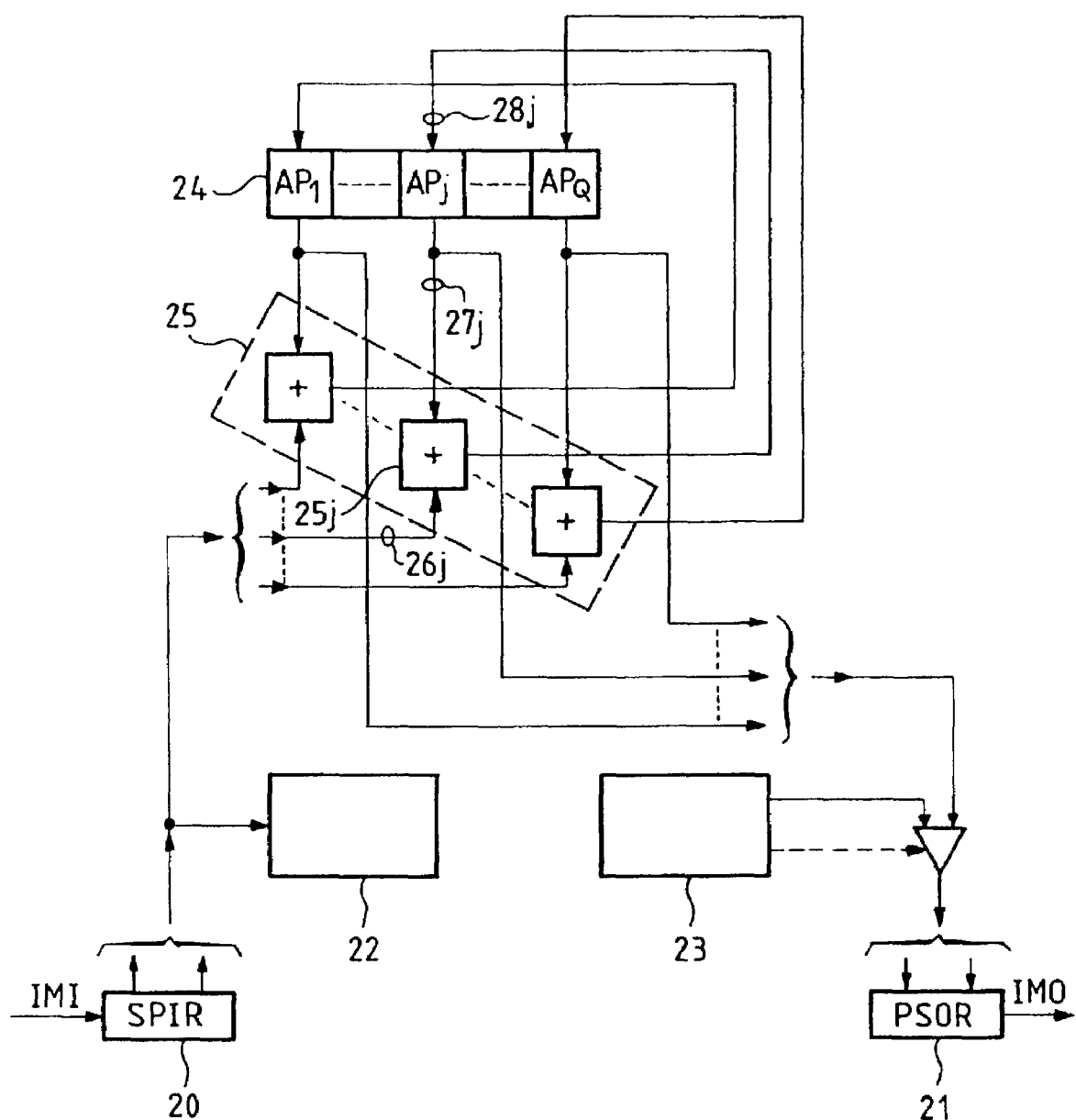

METHOD FOR MUTUAL TRANSFERS OF CONTROL PARAMETERS THROUGH A COMMUNICATIONS NETWORK

BACKGROUND OF THE INVENTION

1. Field of the Invention

The invention relates to systems for communicating data, and more particularly for transferring control parameters through the communications network used for transferring the data.

2. Description of the Related Art

In general, a communications network is connected to a set of terminal modules. The terminal modules are interconnected by the network, and data is transferred through the network, from the incoming fraction of the terminal modules then referred to as "incoming" terminal modules to the outgoing fraction of the terminal modules then referred to as "outgoing" terminal modules. These designations are used to facilitate understanding when referring to the direction of data transfer, it being understood that the terminal modules generally act simultaneously both as incoming terminal modules for data they transmit to the communications network and as outgoing terminal modules for data they receive from the network.

The terminal modules also exchange control parameters through the same communications network, typically for the purposes of supervising or controlling the operation of the communications system, i.e. the system comprising the network and/or its terminal modules. These control parameters are transferred in dedicated control messages.

By way of example, in an asynchronous network, a distributed mechanism for periodically verifying the consistency of connections established between terminal modules implies exchanging "information" parameters characterizing said connections. Under such circumstances, the information parameters are transferred in "information" messages which are transmitted by "source" terminal modules and received by "destination" terminal modules. Still by way of example, in an asynchronous switching network, a distributed dynamic inter-module rate-based flow control mechanism implies two types of mutual exchange of control parameters between all the pairs of terminal modules:

in the go direction, transferring "information" parameters characterizing broadband allocation requests for transmitting data through the network; and in the return direction, transferring associated "response" parameters characterizing grants of authorized bandwidth.

Under such circumstances, and throughout the description below, the term "go" direction is used to refer to transferring an information message from a "source" terminal module to a "destination" terminal module, and the term "return" direction is used for transferring an associated response message from said destination terminal to said source terminal.

The invention relates to the mutual transfer of such control parameters between terminal modules. In an asynchronous communications network, the corresponding dedicated control messages use inter-module control data blocks (packets or cells) which can advantageously be of varying lengths, such as multiple-segment cells, for example. FIG. 1 shows examples of multi-segment cells. The first cell shown is a three-segment cell; the first segment is marked SRT in the figure (for self routing tag) and constitutes the header for the cell, containing routing information; the following two cells may be used for placing the control parameters to be transmitted. FIG. 1 also shows another cell having five segments available for placing control parameters for transmission. Each segment typically has a size of 64 bits. The variable S is used below to designate the number of segments used for placing control parameters in a cell, such that the total size of a cell for a dedicated control message is 1+S segments, and its available payload capacity for placing control parameters is S times 64 bits.

A first conventional approach is based on point-to-point transfer of dedicated control cells from each terminal module to each other terminal module; such point-to-point messages can then contain only those parameters that relate to a particular pair of terminal modules. To simplify the wording of the text below, the term (information or response) "control parameter" is used in the singular when it relates to a given pair of terminal modules, it being understood that in practice this might involve a single parameter or else a group of parameters representing said pair.

Another conventional approach is based on point-to-multipoint transfer of dedicated control cells from each terminal module to each set of a given plurality ($n$) of terminal modules; such point-to-multipoint messages can then contain control parameters relating to a plurality ($n$) of pairs of terminal modules. In certain network configurations comprising a large number of terminal modules, those conventional solutions can give rise to relatively heavy traffic dedicated to control messages, which traffic is additional to the payload data traffic between terminal modules and can thus lead to traffic overloading in the network; one of the problems encountered is thus that of minimizing the impact of this additional traffic due to mutual transfers of control parameters.

SUMMARY OF THE INVENTION

The invention proposes a solution to that problem. It enables control parameters to be transferred mutually through the network while significantly reducing the additional traffic generated by transferring such control parameters compared with solutions known in the prior art.

More precisely, the invention provides a method of mutually transferring control parameters between terminal modules interconnected by a communications network transferring data from "source" terminal modules to "destination" terminal modules, "information" control parameters being transferred from the source terminal modules to the destination terminal modules by means of dedicated information messages, each source terminal module transferring to a plurality of destination terminal modules at least one information parameter relating to each of the destination terminal modules; the method being characterized in that the mutual transfers of information messages between terminal modules take place by means of "distributed" functions, in that a distributed function is allocated to a set of destination terminal modules and to a set of source terminal modules, and in that the method comprises the steps of:

a source terminal module generating at least one dedicated information message comprising information parameters relating to the destination terminal modules of each associated distributed function which is allocated to said source terminal module;

transmitting each information message from the said source terminal module to said corresponding distributed function;

each distributed function receiving information messages coming from a plurality of source terminal modules to which it is allocated;

each distributed function processing the information parameters of the received information messages, said parameters relating to the source terminal modules and to the destination terminal modules to which the function is allocated; and each distributed function generating and transmitting at least one information message comprising the results of the processing of said information parameters.

In a first implementation, the processing performed by the distributed function comprises separating the information parameters relating to a plurality of destination terminal modules and coming from a single source terminal module, and regrouping information parameters relating to a single destination terminal module and coming from different source terminal modules in at least one new information message; the method further comprises the step of each destination module receiving at least one information message from each of the distributed functions with which it is associated.

In a second implementation, the processing performed by the distributed function comprises aggregating information parameters relating to a single destination terminal module and coming from a plurality of source terminal modules, so as to generate at least one aggregated parameter relating to each destination terminal module.

In this case, it is advantageous for the generating and transmitting step performed by the distributed function to comprise transmitting at least one information message to each destination terminal module with which it is associated; the method then further comprises a step of each destination terminal module receiving at least one information message transporting at least one aggregated parameter coming from each of the distributed functions with which it is associated.

In the second implementation, provision can also be made for the mutual transfers of information messages between terminal modules further to take place via destination functions; a destination function is then allocated to a set of destination terminal modules and to a set of distributed functions; each destination function takes the place of said set of destination terminal modules for the purpose of performing the final reception operations on information messages; in which case the generating and transmission step performed by the distributed functions comprises transmitting at least one new information message to at least one destination function, and the method further comprises a step of each destination function receiving information messages transporting at least one aggregated parameter coming from the distributed functions to which it is allocated.

In the first implementation, provision can also be made for the method also to comprise mutual transfers of "response" control parameters in dedicated response messages generated by each of the destination terminal modules and sent to the source terminal modules, each destination terminal generating at least one response message comprising at least one response parameter; for the response message transfers generated by the destination terminal modules to the source terminal modules also to take place via associated distributed functions; and for the method to comprise the steps of:

the destination terminal module generating and transmitting to each of the associated distributed functions at least one response message to be sent to a plurality of source terminal modules;

each distributed function receiving response messages coming from a plurality of destination terminal modules to which it is allocated;

the distributed function processing response messages coming from different destination terminal modules;

the distributed function generating and transmitting to the source terminal modules to which it is allocated at least one new response message regrouping the response parameters; and each of said source terminal modules receiving response parameters relating to a plurality of destination terminal modules in the response messages transmitted by each associated distributed function.

In this case, it is possible for each response message transmitted by a destination terminal module to comprise, for each source terminal module, at least one individual response parameter per source terminal module; and for the processing step evaluated by the distributed function to consist in separating the individual response parameters for a plurality of source terminal modules in each received response message and in regrouping individual response parameters relating to a single source terminal module and coming from different destination terminal modules in at least one new response message.

Still in this case, each response message transmitted by a destination terminal module may comprise at least one common response parameter that is identical for all of the source terminal modules; and the processing step performed by the distributed function may consist in regrouping common response parameters coming from different destination terminal modules in at least one new response message.

In another implementation, the method also comprises mutual transfers of "response" control parameters in dedicated response messages each generated by said destination functions for sending to the source terminal modules; and a destination function also takes the place of the destination terminal modules of said set for further performing a step of generating at least one common response parameter that is identical for all of the source terminal modules for each of the terminal modules of said set, a step of generating at least one common response message comprising at least one common response parameter relating to each of the destination terminal modules of said set, and a step of transmitting said messages to the source terminal modules.

In this case, a destination function transmits at least one common response message directly to the source terminal modules, and the method further comprises a step in which each of said source terminal modules receives common response parameters relating to a plurality of destination terminal modules in the response messages transmitted by each destination function.

Still in this case, the transfers of response messages from the destination functions to the source terminal modules take place advantageously via distributed functions, a destination function transmitting at least one common response message to the destination functions to which it is allocated; and the method further comprises the steps of:

each of said associated distributed functions receiving at least one common response message coming from the destination function to which it is allocated;

a distributed function performing processing consisting in redistributing each common response message to the source terminal modules;

a distributed function generating and transmitting each common response message to the source terminal modules to which it is allocated; and each of said source terminal modules receiving common response parameters relating to a plurality of destination terminal modules in the response messages transmitted by each associated distributed function.

To maintain coherence between the common response parameters received by the source terminal modules relative to the information parameters they have transmitted, while providing protection against the possibility of messages being lost while they are being transferred through the communications network, it is also possible to make provision for said step of processing the information parameters by means of a distributed function also to comprise an operation of storing in the distributed function a binary flag per source terminal module specifying whether the function has properly received an information message from said source terminal module; in this case said step of receiving information messages in a destination terminal module also comprises an operation of storing in the destination terminal module a binary flag per distributed function specifying whether an information message has been properly received from said distributed function; said step of generating a response message in a destination terminal module also comprises an operation of incorporating in each response message a binary flag per distributed function involved specifying, on the basis of the locally stored flags, whether or not said destination terminal module has properly received an information message coming from said distributed function; and said step of a distributed function processing response parameters further comprises an operation of incorporating in each response message sent to a source terminal module, a binary flag per destination terminal module specifying whether or not each response parameter corresponding to said destination terminal module is valid, validation depending firstly on the binary flags received by the distributed function in the response messages, and also on the binary flags stored locally in the distributed function.

In another implementation, in order to maintain coherence between the common response parameters received by the source terminal modules relative to the information parameters they have transmitted, while providing protection against the possibility of messages being lost while they are being transferred through the communications network, said step of processing information parameters in a distributed function also comprises an operation of storing in the distributed function a binary flag per source terminal module specifying whether it has properly received an information message from said source terminal module; said step of receiving information messages in a destination function also comprises an operation of storing in the destination function a binary flag per distributed function specifying whether it has properly received an information message from said distributed function; said step of generating a response message in a destination function also comprises an operation of incorporating in each response message a binary flag per distributed function concerned specifying, on the basis of locally stored flags, whether or not said destination function has properly received an information message coming from said distributed function; and said step of processing response parameters by a distributed function also comprises an operation of incorporating in each response message for sending to a source terminal module a binary flag per destination terminal module specifying whether each response parameter corresponding to said destination terminal module is valid, validation depending firstly on the binary flags received by the distributed function in the response messages and secondly on the binary flags stored locally in the distributed function.

In another implementation of the invention, the response messages transporting identical common parameters for all of the source terminal modules are identical messages, and they are transferred on a point-to-multipoint basis when they are transited to a plurality of destinations.

It is also possible for each source terminal module to transmit information parameters in an information message, the parameters relating to each of the destination terminal modules, each information parameter characterizing the volume of data traffic that a source terminal module seeks to transmit to a destination terminal module; each destination terminal module, or each destination function taking the place thereof, then transmits in a response message response parameters relating to each of the destination terminal modules, each response parameter enabling each source terminal to determine the volume of data traffic which it is authorized to transmit to a destination terminal module.

Preferably, said distributed functions are implemented using additional means introduced in at least some of the terminal modules which then also act as respective distributed functions, and each terminal module which generates control messages for at least one distributed function also knows the identity of each terminal module taking on the role of each given distributed function, thus enabling said messages to be addressed to the appropriate distributed functions.

It is also possible to provide for said destination functions to be implemented using additional means introduced in at least some of the terminal modules which then also act as respective destination functions; each distributed function which generates control messages for at least one destination function also knows the identity of each terminal module taking on the role of each destination function, thus enabling said messages to be addressed to the appropriate destination functions.

BRIEF DESCRIPTION OF THE DRAWINGS

Other characteristics and advantages of the invention appear on reading the following description of implementations of the invention, given by way of example and with reference to the accompanying figures, in which:

FIG. 1 shows prior art cells each having a plurality of segments;

FIG. 2 is a folded diagram of a communications system comprising terminal modules interconnected by a switching network;

FIG. 3 is an unfolded diagram of the FIG. 2 system, with incoming terminal modules shown separate from outgoing terminal modules;

FIG. 4 shows an example of processing in a distributed intermediate message-processing function of the invention;

FIG. 5 is a diagram of a configuration of distributed functions of the invention;

FIG. 6 is a diagram of another configuration of distributed functions of the invention;

FIG. 7 is a diagram of an implementation of the invention using individual response parameters in the return direction;

FIG. 8 is a diagram of message transfers via distributed functions of the invention, using common response parameters in the return direction;

FIG. 9 is a diagram of message transfers via distributed functions of the invention, using aggregated information parameters in the go direction and common response parameters in the return direction;

FIG. 10 is a diagram of message transfers via distributed functions of the invention using destination functions, aggregated information parameters in the go direction, and common response parameters in the return direction;

FIG. 11 is a diagram similar to FIG. 10, but without a masking system;

FIG. 12 is a hardware implementation diagram of a distributed function performing processing consisting in separating control functions and grouping them together; and FIG. 13 is a hardware implementation diagram of a distributed function implementing processing consisting in aggregating control parameters.

DETAILED DESCRIPTION OF THE EXEMPLARY EMBODIMENTS

The invention relates to data communications systems in which control parameters are transferred mutually between terminal modules via dedicated control messages passing through the same communications network as the data. In order to reduce the overload of additional traffic generated by these control messages, the invention proposes performing the mutual transfers of control messages by means of distributed functions, each of these functions being allocated to a set of source terminal modules and to a set of destination terminal modules.

FIG. 2 is a folded diagram of a communications system comprising N terminal modules (MT1 to MTn) interconnected by a switching network (RC). The switching network RC can be of any internal configuration; it provides full accessibility enabling all of the terminal modules to be interconnected. In general, each terminal module comprises an incoming portion which transmits data to the communications network, and an outgoing portion which receives data from the network. With the network being shown in a folded diagram, dashed line D illustrates data transmitted by the incoming portion of a terminal module MTi, referenced MTEi being transferred so as to be received by the outgoing portion of a terminal module MTj, said portion being referenced MTSj.

FIG. 3 is another diagram showing the same communications system as FIG. 2, but this time the diagram is unfolded, so that the difference between the incoming and outgoing portions of the terminal modules appears, for each terminal module MT, as physical separation into two modules referred to as an incoming terminal module (MTE) and an outgoing terminal module (MTS). It should be understood that this is merely a form of representation that is intended to facilitate understanding when it is necessary to refer to the direction of data transfer, whereas in practice each terminal module can be a both-way module, i.e. can comprise both an incoming terminal module and an outgoing terminal module.

In FIG. 3a, dashed line I shows the simple case of a control message being transferred similar to that represented by D in FIG. 2, the message being transmitted by an incoming terminal module MTEi (i.e. by the incoming portion of the terminal module MTi), and being received by an outgoing terminal module MTSj (i.e. the outgoing portion of the terminal module MTj). Such a control message transferred in the go direction, is referred to as an "information" message, and is transmitted by a "source" terminal module (i.e. a source of the information message), in this case the incoming portion MTEi of MTi, so as to be received by a "destination" terminal module (i.e. destination of the information message), in this case the outgoing portion MTSj of MTj.

In FIG. 3b, dashed lines I and R show the case of a dual transfer of associated control messages between two terminal modules, e.g. MTi and MTj, i.e. a transfer comprising:

not only the same go direction information message as represented by dashed line I from the source terminal module, i.e. the incoming portion MTEi of MTi, to the destination terminal module, i.e. the outgoing portion MTSj of MTj;

but also a "response" message in the return direction represented by dashed line R which is associated with said information message in that it is transmitted in the opposite direction by the destination terminal module, in this case the portion MTEj of MTj, and received by the source terminal module, in this case the outgoing portion MTSi of MTi.

Thus, below, two different aspects relating to the terminal modules are distinguished:

concerning the physical transfer through the network RC, every data or control message transfer always takes place from the incoming portion of a terminal module, referred to as the incoming terminal module MTE, and goes to the outgoing portion of a terminal module referred to as the outgoing terminal module MTS;

in addition, for control message transfers, the terms "source" and "destination" relate to an information message, and thus an information message in the go direction is transferred from a "source" terminal module to a "destination" terminal module, while a response message in the return direction is transferred from a destination terminal module back to a source terminal module.

A communications system is considered that is capable of having a large number N of terminal modules, e.g. N=2048, it being understood that the traffic overload generated by mutually transferring control messages between all of said modules taken in pairs increases quadratically with increasing number N of modules. In addition, in order to evaluate the volumes of control message traffic, it is assumed that mutual transfers of control parameters take place at a frequency characterized by a periodic cycle Tr.

In the description below, a parameter is used that is representative of the volume of control message traffic generated per time period Tr for each portion of a terminal module, i.e. in transmission and in reception, respectively for the incoming terminal modules and the outgoing terminal modules as mentioned above. This volume of traffic per period Tr is written IMCMD and it is expressed as a number of segments.

The first conventional approach mentioned above assumes that control messages are transferred point to point and contain only one control parameter relating to a single pair of terminal modules, since in that approach each terminal module transmits a distinct message to each other terminal module. In that case, the value of the traffic volume IMCMD is equal to the product of the number of terminal modules multiplied by the size of a command message expressed as a number of segments. By way of exception, if the control parameter is of a size that is sufficiently small to be included in the header segment containing the routing information, then the cell of such a message has only one segment, and IMCMD has a value equal to the number of terminal modules, i.e. 2048 in the above example. If the size of the control parameter requires a second segment to be provided in the message, then IMCMD has a value which is twice the total number of terminal modules; this assumes that the control parameter is of a size that is smaller than one cell segment, which is generally the case.

The second above-mentioned conventional approach assumes that control messages containing control parameters relating to a plurality (n) of pairs of modules in a single message are transferred on a point-to-multipoint basis. In this second case, the value of the traffic volume IMCMD depends on the size (P) of the transmitted control parameter and also on the size of the cell used for each control message, which determines the number Q of destination terminal modules concerned by a given message.

It is assumed below in this example that the cells present 64-bit segments, i.e. 8-byte segments. In this case, the volume of traffic per period Tr is:

$$IMCMD = N \times (P/8) \times (1+S)/S$$

where, as before, S is the number of segments in a cell that are available for placing parameters, and P is the size of the control parameter expressed in bytes, the factor P/8 then being the size of the same parameter expressed in 8-byte segments, and the quantity (1+S)/S expresses the fact that a (1+S)-segment cell has a payload capacity of S segments available for placing parameters.

Applying this formula to a value of P equal to 1 byte and a number N equal to 2048 terminal modules, leads to the following values as a function of S, for example:

IMCMD=288 segments for a value of S=8, i.e. messages using 9-segment cells; and

IMCMD=384 segments for a value of S=2, i.e. messages using 3-segment cells.

The amount of additional control message traffic (i.e. the amount of "overhead" traffic) is calculated by determining the amount of traffic needed for transferring the control parameters between all possible pairs of source and destination terminal modules for the go and return directions, and for each time period Tr. It is possible to calculate the additional control traffic in transmission (written OVHtm/t below) separately from the additional control traffic in reception (written OVHtm/r below). These values are expressed as proportions of the total data rate DT in transmission and in reception of a terminal module, e.g. DT=2.4 gigabits per second (Gb/s).

In the first conventional approach (point-to-point message transfers), for a data rate DT of 2.4 Gb/s and segments of 64 bits, the additional control traffic volume for a terminal module in transmission (OVHtm/t) represents the following proportion of the total data rate DT:

$$OVHtm/t = 2 \times IMCMD \times 64/2.4 \times 10^6 \times Tr$$

$$OVHtm/t = 53.3 \times 10^6 \times IMCMD/Tr$$

where the period Tr in the above formula is expressed in milliseconds (ms). The factor 2 takes account of two types of transfer: in the go direction for transferring information messages; and in the return direction for transferring the associated response messages. An incoming terminal module transmits both as a source terminal module when sending information messages, and as a destination terminal module when sending response messages; similarly, an outgoing terminal module receives both as a destination terminal module receiving information messages, and as a source terminal module receiving response messages.

For a control message using single-segment cells (parameter in the header segment), the value of the traffic volume IMCMD is equal to N, and the following applies:

$$OVHtm/t = 53.3 \times 10^6 \times N/Tr \qquad (1)$$

which in the example of N=2048 terminal modules gives:

$$OVHtm/t = 0.109/Tr$$

In other words, for a period of 1 ms, the additional volume due to control traffic represents 10.9% of the total data rate DT.

For a dedicated message using two-segment cells, it is shown above that the value of the traffic volume IMCMD is equal to twice the number N of terminal modules, i.e.:

$$OVHtm/t = 107 \times 10^6 \times N/Tr \qquad (2)$$

which for the example of N=2048 terminal modules, gives:

$$OVHtm/t = 0.218/Tr$$

In other words, for a period of 1 ms, the additional volume of control traffic represents 21.8% of the total data rate DT.

Still on the assumption of messages being transferred point to point, the additional traffic volume for a terminal module in reception (OVHtm/r) is calculated in the same manner. This traffic volume has the same value as the additional traffic in the transmit direction, since each terminal module in this assumption receives as many messages as it sends, thus:

$$OVHtm/r = OVHtm/t \qquad (3)$$

In the second conventional approach of point-to-multipoint message transfers, and using the same notation and the same assumptions, the additional volume of control traffic for each terminal module in transmission represents the following proportion of the total data rate DT:

$$OVHtm/t = 2 \times IMCMD \times 64/2.4 \times 10^6 \times Tr$$

which, replacing IMCMD by the value calculated above, leads to:

$$OVHtm/t = 6.67 \times N \times P \times (1+S)/(S \times 10^6 \times Tr) \qquad (4)$$

Assuming that the value of P is 1 byte, N=2048 modules, and Tr=1 ms, then the additional volume of control traffic in transmission represents the following proportion of the total data rate DT:
for S=2 OVHtm/t=2.05%;
for S=4 OVHtm/t=1.71%;
for S=8 OVHtm/t=1.54%.

The additional volume of traffic in reception (OVHtm/r) is calculated by considering that a dedicated control message received by a terminal module actually contains only one control parameter relating thereto, since the other message parameters relate to other modules.

Using the preceding assumptions, each received message contains S×8/P control parameters, but only one of these parameters relates to the destination terminal module. In this second approach, the additional volume of traffic in reception is thus equal to the additional volume of traffic in transmission multiplied by a factor of S×8/P, i.e.

$$OVHtm/r = (S \times 8/P) \times OVHtm/t$$

which using equation (4) above gives:

$$OVHtm/r = 53.3 \times 10^{-6} \times N \times (1+S)/Tr \qquad (5)$$

Assuming that P is equal to one byte, N=2048 modules, and Tr=1 ms, the additional control traffic in reception represents the following proportion of the total data rate DT:
for S=2 OVHtm/r=32.8%;
for S=4 OVHtm/r=54.6%;
for S=8 OVHtm/r=98.3%.

Compared with the first approach, using point-to-point control message transfers, this second approach using pointto-multipoint control message transfers thus achieves a significant reduction in additional control traffic in transmission; however it also leads to a significant increase, and in the end an excessive increase, in additional traffic in reception. The invention makes it possible to conserve the advantages of the second approach of the prior art concerning the amount of additional traffic in transmission caused by transferring control messages by generating messages containing control parameters relating to a plurality of other terminal modules. It also makes it possible to reduce significantly the amount of additional traffic in reception compared with that second approach. For this purpose, the invention proposes that mutual transfers of control messages between the terminal modules should take place via distributed intermediate functions for processing messages, referred to below more simply as "distributed functions". These functions are said to be "intermediate" in the sense that they perform intermediate processing on the control parameters in the messages mutually transferred between the source and destination terminal modules.

These functions are also said to be "distributed" in the sense that each of them is allocated to a given set of source terminal modules and to a given set of destination terminal modules, these sets possibly being subsets of the total number N of terminal modules. Finally, these functions perform processing on the parameters transferred in the control messages, as explained in the example of FIG. 4 and in the examples of the following figures.

Consideration is given below initially to the case of mutual transfers of information parameters in the go direction in information messages that are processed by these intermediate functions. For each distributed function allocated thereto, each source terminal module generates at least one dedicated information message comprising information parameters relating to the destination terminal modules which are allocated to said distributed function. The messages generated are then transmitted by the source terminal module to the respective distributed functions.

A distributed function receives information messages coming from the source terminal modules to which it is allocated; it processes the information parameters contained in the received information messages, these parameters relating to the destination terminal modules to which it is allocated. It then generates at least one information message containing at least one information parameter that results from the processing performed on the received information parameters, and it then transmits this message.

Even though a source terminal module sends an information message grouping together information parameters relating to a plurality of destination terminal modules, the intermediate processing performed by the distributed functions enable the additional traffic received by the destination terminal modules to be reduced; this traffic reduction depends on the nature of the processing performed by the distributed functions. The description below gives examples of such processing, in particular with reference to FIG. 4 which gives an example of information parameters being separated and regrouped.

In the description below, the functions of the invention are described independently of their physical locations in the communications network, i.e. in the form of intermediate server modules connected to the network and dedicated by distributed function, or in the form of additional means added to certain terminal modules which then likewise act as a distributed function. Possible but non-limiting embodiments are described further on.

FIG. 4 shows an example of processing performed in a distributed intermediate function for processing messages in accordance with the invention. In the example of this figure, the processing performed by the distributed function comprises separating information parameters relating to a plurality of destination terminal modules and coming from a single source terminal module, and regrouping the information parameters relating to a given destination terminal module and coming from various source terminal modules to form at least one information message of a different type. Thus, in the source terminal modules, the grouping together of a plurality of information parameters in the control messages sent to the distributed functions makes it possible to retain the advantages of the second above-mentioned conventional approach; in addition, in the distributed functions, the regrouping of parameters relating to a given destination terminal module in a single information message makes it possible to avoid significantly increasing the additional control traffic received as described above when analyzing the second conventional approach.

The top portion of FIG. 4 shows a dedicated information message transmitted by a source terminal module to a distributed function allocated thereto. The message presents the structure described above with reference to FIG. 1, having a header segment marked SRT followed by S segments containing information parameters. The various information parameters contained in such a message transmitted by a source terminal module to a distributed function relate to the destination terminal modules to which the distributed function is allocated. FIG. 4 shows the case in which all parameters concerning all of the destination terminal modules are contained in a single information message cell transmitted by each source terminal module. The same principle can be generalized to the case in which each source terminal module transmits all of the parameters in a plurality of information message cells, each cell containing a fraction of all the parameters, said fraction relating to the set of destination terminal modules to which the distributed function is allocated.

The distributed function receives information messages from the various source terminal modules to which it is allocated, each message containing information parameters coming from the source terminal module that sent the message, each of these parameters relating to one of the destination terminal modules to which the distributed function is allocated. The set of message parameters received by the distributed function transmit through a temporary storage device represented by the square situated in the bottom left-hand portion of FIG. 4. In this square, "i,j" represents the order or index i of the source terminal module and the index j represents the destination terminal module, to which a particular information parameter relates. This storage device has as many rows as columns in the example shown where the cardinal number of the set of source terminal modules to which the distributed function is allocated is selected to be equal to the cardinal number of the set of destination terminal modules to which the distributed function is allocated. Other configurations are naturally possible, in which case the square of FIG. 4 would become a rectangle, without the processing differing otherwise.

The distributed function separates the various information parameters coming from a source terminal module; it regroups the information parameters relating to a single destination terminal module and coming from various different source terminal modules. To perform this processing, the distributed function begins by writing in each row i of the storage device the set of parameters in the information message received from each source terminal module $i$; then, it subsequently reads each column $j$ of the storage device, that column containing the set of parameters constituting the new information message that is to go to each destination terminal module $j$, these parameters then being regrouped in a new information message that is represented vertically on the right-hand side of the figure. In this example, after reading the column $j$ from the storage device, the message transmitted by the distributed function is sent to the destination terminal module of index $j$; the message can still have the structure described with reference to FIG. 1, i.e. a header segment followed by S segments for containing the content of the regrouped information parameters. The new information message transmitted by the distributed function in the example shown in FIG. 4 comprises parameters relating to the terminal module $j$ and coming from the various source terminal modules to which the distributed function is allocated.

Thereafter, the distributed function transmits the new messages that result from the processing it has performed to the respective destination terminal modules to which it is allocated. It will thus be understood that in the go direction, each destination terminal module receives new dedicated information messages containing only (or essentially) information parameters that are addressed to that destination terminal module, these messages being received from the distributed function allocated thereto. This avoids significantly increasing the additional control traffic in reception OVHtm/r that is shown up by formula (5).

The process of processing control messages as illustrated in FIG. 4 is described above for mutual transfers in the go direction of information parameters in messages generated by source terminal modules and regrouped by the distributed functions into new information messages sent to the destination terminal modules.

It will readily be understood that a symmetrical process can also be performed by such distributed intermediate functions for mutual transfers in the return direction of response parameters in messages generated by the destination terminal modules and regrouped by the distributed functions into new response messages sent to the source terminal modules.

For processing performed by a FIG. 4 distributed function, it is simple to calculate the volumes of control traffic: for example, assuming that the new control messages transmitted by a distributed function have the same size as the messages it receives from the terminal modules, and assuming the cardinal numbers of the sets of source terminal modules and destination terminal modules to which a distributed function is allocated are equal, the control traffic volumes processed in a distributed function in transmission and in reception (OVHicdf/t and OVHicdf/r) are equal, and these traffic volumes are also equal to the additional volumes of control traffic in transmission and in reception at a terminal module (OVHtm/t and OVHtm/r) which are likewise equal. The values determined above thus apply again, i.e. assuming a value of P equal to one byte, N=2048 terminal modules, and Tr=1 ms, these control traffic volumes represent the following proportions of the total data rate DT:

for S=2:
OVHtm/t=OVHtm/r=OVHicdf/t=OVHicdf/r=2.05%;
for S=4:
OVHtm/t=OVHtm/r=OVHicdf/t=OVHicdf/r=1.71%;
for S=8:
OVHtm/t=OVHtm/r=OVHicdf/t=OVHicdf/r=1.54%.

An example of message transfer using processing of the kind shown in FIG. 4 is described with reference to FIG. 7.

FIGS. 5 and 6 show possible examples that can be selected for distributed function modularity and allocation. FIG. 5 is a diagrammatic representation of a go-direction configuration for distributed functions of the invention. The terminal modules MT are grouped together in terminal switching unit groups (TSUGs). There are $t$ of these groups referenced TSUG1 to TSUGt, each group comprising $m$ terminal modules; the total number N of terminal modules is thus equal to the product of $t$ multiplied by $m$. FIG. 5 is an unfolded representation, of the same type as that shown in FIG. 3, where incoming terminal modules MTE are shown separate from outgoing terminal modules MTS, respectively grouped together in incoming groups of incoming terminal modules (TSUGi1 to TSUGit) and outgoing groups of outgoing terminal modules (TSUGo1 to TSUGot). In the example of FIG. 5, there are as many distributed functions (ICDF1 to ICDFt) as there are groups of destination terminal modules. Under such circumstances, each distributed function is thus allocated to the MTSes of an outgoing group, and it is allocated to all of the source terminal modules, i.e. to all of the MTEs. As a result, in the go direction, each MTE is a source terminal module which transmits at least one information message to each distributed function, each message grouping together information parameters relating to the MTSes which constitute destination terminal modules of the outgoing group to which the function is allocated. A distributed function receives these messages from all of the source terminal modules. It separates the parameters and regroups them as explained with reference to FIG. 4, retransmitting new information messages to each of the destination terminal modules to which it is allocated. Each new message may comprise information parameters coming from various source terminal modules and relating solely to the destination terminal modules to which the message is sent.

It can be observed that it is also possible to provide a configuration that is the inverse of that shown in FIG. 5, in which the distributed functions receive information messages from a group of source terminal modules, and transmit new messages to all of the destination terminal modules.

A configuration of distributed functions as shown in FIG. 5, or its inverse, can also be used for transferring the response messages in the return direction. However, in either case, the control message traffic processed by an intermediate function can become too great in certain large-capacity configurations.

To mitigate this drawback, FIG. 6 is a diagram representing another go-direction configuration for the distributed functions of the invention, in which provision is further made to share the distributed functions on the basis of a certain number of incoming groups TSUGi of MTEs which are source terminal modules in the go direction. The following notation is used in FIG. 6:

m: the number of terminal modules in a TSUG group;

t: the total number of TSUG groups of source terminal modules (and also of destination terminal modules);

K: a submultiple of $t$, splitting the $t$ incoming groups TSUGi into K sets of X (=t/K) incoming groups TSUGi; and $Y=t-X+1$.

The K distributed functions ICDFj/1 to ICDFj/K are allocated to the outgoing group of order $j$ of destination terminal modules (TSUGoj), and each of these K distributed functions ICDFj/z ($1 \leq z \leq K$) is allocated to a set of X incoming groups of order z of source terminal modules (e.g. TSUGiY to TSUGit, for z=K). The figure shows only two sets of distributed functions ICDF1/1 to ICDF1/K and ICDFt/1 to ICDFt/K allocated to respective groups of destination terminal modules TSUG1 and TSUGt. This configuration makes it possible to reduce the number of messages that a distributed function receives, avoiding any need for a distributed function to receive messages coming from all of the source terminal modules.

As in the example shown in FIG. 5, it would alternatively be possible to provide an inverse configuration: in which case a distributed function would receive information messages from an incoming group of source terminal modules, and would forward new messages to X outgoing groups of destination terminal modules.

A configuration of distributed functions as shown in FIG. 6, or indeed its inverse, can also be used to transfer response messages in the return direction.

More generally, the cardinal number of the sets of source and destination terminal modules to which a distributed function is allocated can be varied in ways other than the examples of FIGS. 5 and 6. A distributed function can thus be allocated to sets having different cardinal numbers, or to sets having the same cardinal number. In the examples of FIGS. 5 and 6, the source and destination terminal modules are separated into groups TSUG. Other types of separation, within a TSUG group, could also be implemented.

Other examples of distributed function modularity can be deduced from following FIGS. 7 to 11. In FIGS. 7 to 9, each distributed function is allocated to m×X=32 source terminal modules and to m=32 destination terminal modules (in an example where X=1). Thus, in the go direction, each source terminal module sends information messages to t=32 distributed functions, and each destination terminal module receives new information messages from K=32 distributed functions.

In a configuration of distributed functions of the kind shown in FIG. 6, and when applying processing of the kind shown in FIG. 4, control traffic volumes are calculated as follows. It is assumed below that the messages received and transmitted by a distributed function have the same size of 1+S segments. In the terminal modules, by means of the parameter rearrangement processing performed by the distributed functions, as in the example of FIG. 5, the additional traffic volume in reception OVHtm/r is equal to the additional traffic volume in transmission OVHtm/t, each having the same value as the additional traffic in the transmission direction OVHtm/t calculated for the second above-mentioned conventional approach. Thus, assuming that P is equal to one byte, N=2048 modules, and Tr=1 ms, the additional traffic volume at a terminal module, both in transmission and in reception OVHtm, represents the following proportions of the total data rate DT:
  for S=2 OVHtm=2.05%;
  for S=4 OVHtm=1.71%;
  for S=8 OVHtm=1.54%.

The traffic in each of the distributed functions is calculated as follows. Each distributed function forwards as many information parameters as it receives; thus, for each distributed function on the assumption that the messages received and forwarded by a distributed function are of the same size, the volume of control traffic in transmission is equal to the volume of control traffic in reception; this value is written below as OVHicdf. The following also applies:

$$OVHicdf = OVHtm \times m/K$$

where m is the number of terminal modules per group TSUG and K is the number of distributed functions allocated to a given outgoing group TSUGo of destination terminal modules. For example, considering the control traffic in transmission of the function ICDF1/1 of FIG. 6, this relationship is representative of the fact this traffic is the sum of information message traffic and response message traffic, i.e. traffic comprising respectively:
  in the go direction, all of the information messages forwarded to the m terminal modules of the outgoing group TSUGo to which it is allocated, this traffic volume being equal to the information message traffic received by a destination terminal module (i.e. OVHtm/2) multiplied by the number (m) of destination terminal modules of the group TSUGo, and divided by the number (K) of distributed functions allocated to the destination terminal modules of said group TSUGo, giving traffic equal to OVHtm×m/2×K; and
  in the return direction, all of the response messages forwarded to the m×X source terminal modules to which it is allocated, this traffic volume being equal to the response message traffic received by a source terminal module (i.e. OVHtm/2) multiplied by the number (m×X) of source terminal modules to which it is allocated and divided by the number (t) of distributed functions allocated to said set of m×X source terminal modules, giving traffic that is likewise equal to OVHtm×m/2×K, so that the sum of these two traffic volumes is indeed equal to OVHtm×m/K.

This gives:

$$OVHicdf = 2 \times IMCMD \times 64 \times m/K \times 2.4 \times 10^6 \times Tr$$

and replacing IMCMD in the above formula by its value as calculated above, this gives:

$$OVHicdf = 2 \times N \times m \times (P/8) \times (1+2) \times 64/K \times S \times 2.4 \times 10^6 \times Tr$$

$$OVHicdf = 6.67 \times 10^{-6} \times N \times m \times P \times (1+S)/K \times S \times Tr \qquad (6)$$

Returning to the assumption that P is equal to one byte, the control traffic volume at a distributed function OVHicdf in transmission as in reception is found to represent the following proportion of the total data rate DT as a function of the value S characterizing the size used for the control messages:
  for S=2 OVHicdf=10.00×10$^{-6}$×N×m/K×Tr
  for S=4 OVHicdf=8.33×10$^{-6}$×N×m/K×Tr
  for S=8 OVHicdf=7.50×10$^{-6}$×N×m/K×Tr which gives, for N=2048 and m=64:

for S=2 OVHicdf=1.31/K×Tr, i.e. for Tr=1 ms:
  for K=32 OVHicdf=4.10%
  for K=16 OVHicdf=8.19%
  for K=8 OVHicdf=16.4%
  for K=4 OVHicdf=32.8%
  for K=2 OVHicdf=65.5%
  for K=1 OVHicdf=131% for S=4 OVHicdf=1.09/K×Tr, i.e. for Tr=1 ms:
  for K=32 OVHicdf=3.41%
  for K=16 OVHicdf=6.83%
  for K=8 OVHicdf=13.7%
  for K=4 OVHicdf=27.3%
  for K=2 OVHicdf=54.6%
  for K=1 OVHicdf=109% for S=8 OVHicdf=9.83/K×Tr, i.e. for Tr=1 ms:
  for K=32 OVHicdf=3.07%
  for K=16 OVHicdf=6.14%
  for K=8 OVHicdf=12.3%
  for K=4 OVHicdf=24.6%
  for K=2 OVHicdf=49.2%
  for K=1 OVHicdf=98.3%.

These calculations show that the traffic volumes at the distributed functions can remain low providing the number K is high enough. In addition, it can be observed that the values for K=1 are the values that are obtained in the simpler configuration of FIG. 5. The invention thus makes it possible to maintain the volume of additional traffic generated by the mutual transfers of control messages at low levels in the terminal modules. In addition, an appropriate selection for the modularity and the allocation of the distributed functions in terms of the sets of terminal modules which are allocated to them makes it possible also to keep the volumes of control message traffic processed in each distributed function to levels that are acceptable.

Implementations of the invention in different configurations and for different types of processing performed by the distributed functions are described with reference to FIGS. 7 to 11. The examples below are assumed to apply to a switching network having a capacity of 1024 terminal modules, each acting both as a source terminal module and as a destination terminal module. The figures show various configurations of the distributed functions used for both types of mutual transfer of control messages: information messages (in the go direction); and response messages (in the return direction). In an "unfolded" representation, the same source terminal modules ITM are shown twice, for reasons of clarity, once on the left as an MTE when they transmit information messages, and once on the right as an MTS when they receive response messages. In the center of FIGS. 7 to 9, each destination terminal module OTM acts as an MTS for the information messages it receives from the distributed functions and as an MTE for the response messages it transmits to the distributed functions.

FIG. 7 is a diagram of an implementation of the invention for transferring individual control parameters per terminal module in the go direction and in the return direction. For example, in the go direction this can be an information parameter characterizing a request to allocate bandwidth for transmitting data through the network, each request being transmitted by a source terminal module to a destination terminal module. In the return direction, the parameter can be constituted, for example, by a response parameter representing the grant of an authorized bandwidth as determined by each of the destination terminal modules and for each of the source terminal modules as a function of its total bandwidth that is currently available and of the various bandwidth allocation requests that have been received from all of the source terminal modules.

The processing performed by the distributed functions in FIG. 7 is of the same kind as that shown in FIG. 4, information parameters are separated and regrouped in the go direction, and response parameters are separated and regrouped in the return direction. The source terminal modules ITM are grouped as TSUG groups having a cardinal number of 32. One distributed function is provided per group of 32 source terminal modules and per group of 32 destination terminal modules. In other words, and as shown in the figure, 32 groups of 32 distributed functions are provided for the maximum capacity of the switch (N=1024 terminal modules). The first group which comprises the distributed functions referenced ICDF1/1 to ICDF32/1 in FIG. 7 receives, in the go direction, messages containing information parameters relating to the first 32 destination terminal modules referenced OTM1 to OMT32 from all of the source terminal modules ITM1 to ITM1024, the first distributed function ICDF1/1 of this group being allocated to the source terminal modules ITM1 to ITM32. In general, in the go direction, a distributed function ICDFi/j receives information messages from source terminal modules ITM(32×i−31) to ITM(32×i), and forwards new information messages to the destination terminal modules OTM(32×j−31) to OTM(32×j). In the return direction, a distributed function ICDFi/j receives response messages from destination terminal modules OTM(32×i−31) to OTM(32×i) and forwards new information messages to destination terminal modules ITM(32×j−31) to ITM(32×j).

This figure also shows the possible sizes of the messages. It is assumed that messages comprise 9 segments, giving S the value of 8. Each information parameter has a size of two bytes, and each segment has a size of 64 bytes. An information message can thus contain information parameters relating to 32 terminal modules. Each source terminal module ITMi thus generates 32 information messages each comprising 9 segments which are sent to the 32 functions ICDFi/j allocated thereto for j varying over the range 1 to 32. Each information message contains the parameters relating to the destination terminal modules OTM(32×j−31) to OTM (32×j) allocated to the distributed function of order j to which the information message is addressed.

Thus, as shown in the figure, each distributed function ICDFi/j receives 32 information messages each of 9 segments from the 32 source terminal modules ITM(32×i−31) to ITM(32×i) to which it is allocated. The distributed function separates the information parameters of the received messages and regroups the information parameters relating to each given destination terminal module into new messages, as explained with reference to FIG. 4. To do this, after receiving from these 32 source terminal modules all of the information parameters for sending to the destination terminal modules to which it is allocated, the distributed function ICDFi/j regroups the 32 information parameters relating to destination terminal modules (OTM(1+32(j−1)) in a single new message having a total size of 9 segments for each destination terminal module. Thus, each distributed function sends 32 new information messages of 9 segments each to each of the destination terminal modules to which it is allocated.

Each destination terminal module receives information messages from the 32 distributed functions which are allocated thereto. Each of these 9-segment messages contains information parameters coming from 32 source terminal modules. This explains the size of 32×9 segments given in FIG. 7 for the messages received by the destination terminal module OTM1.

The description above relates to mutual transfer of information messages in the "go" direction, i.e. the transfer of information parameters from source terminal modules to destination terminal modules. The right-hand portion of the FIG. 7 diagram also shows the transfer of response messages in the "return" direction from the destination terminal modules to the source terminal modules. In this case, the same type of configuration is used for the distributed functions: a distributed function is allocated in reception to 32 destination terminal modules and in transmission to 32 source terminal modules. Each distributed function performs processing similar to that of FIG. 4, i.e. it separates and regroups response parameters.

A difference should be observed between the go direction and the return direction in the example shown in FIG. 7; this difference relates to the size assumed for the response parameters. In the go direction, as explained above, it is assumed that the information parameters have a size of 2 bytes. In the return direction, it is assumed that the parameters are of a smaller size, and specifically a single byte. The response parameters transmitted by a destination terminal module to a given distributed function relates to 32 source terminal modules to which this distributed function is allocated. These parameters can thus be contained in a dedicated response message of 5 segments.

In the embodiment of FIG. 7, the volume of traffic generated by transferring control messages is 32×9+32×5 i.e. 448 segments in transmission as in reception, for each terminal module as for each distributed function.

Using the above assumptions, the additional traffic volumes in a terminal module OVHtm, and the additional traffic volume in each distributed function OVHicdf, in transmission as in reception, represents the following proportion of the total data rate DT:

$$OVHtm/t=OVHtmr=OVHicdf/t=OVHicdf/r$$

$$=448 \times 64/2.4 \times 10^6 \times Tr$$

giving 1.19% for a period Tr of 1 ms.

In comparison, in the above-mentioned second conventional approach with point-to-multipoint transfers, and still using N=1024, S=8, P=2 in the go direction and P=1 in the return direction, with Tr=1 ms, the additional volumes of control traffic in a terminal module, in transmission (OVHtm/t) and in reception (OVHtm/r) represented the following proportions of the total data rate DT:

$$OVHtm/t=10.005 \times 10^{-6} \times 1024 \times 9.8 \times Tr=1.15\%$$

$$OVHtm/r=53.3 \times 10^{-6} \times 1024 \times 9.8 \times Tr=49\%$$

Compared with that second approach, the invention thus makes it possible to reduce the additional control traffic in reception very considerably (1.19% instead of 49%) at the cost of a minimal increase in additional traffic in transmission (1.19% instead of 1.15%).

FIG. 8 is a diagram of mutual transfers of control messages via distributed functions of the invention using common response parameters in the return direction; in the go direction, as in FIG. 7, the information parameters may represent a request for bandwidth allocation for transmitting data through the network as sent by each source terminal module to each destination terminal module. In the return direction, the response parameter is common, i.e. it has the same value for all source terminal modules: by way of example it can be constituted by a coefficient Z indicating that for each source terminal module, the authorized bandwidth which is granted thereto is equal to the product of the bandwidth requested multiplied by the coefficient Z. This common response parameter is determined by the destination terminal module as a function of the total bandwidth currently available to it and as a function of the various bandwidth allocation requests it has received from all of the source terminal modules. On the basis of the common response parameter it receives from a destination terminal module, each source terminal module makes use of the response parameter to determine the bandwidth that is then authorized so as to enable it to transmit data to the corresponding destination terminal module, while taking account of the bandwidth allocation request it sent beforehand.

In addition, FIG. 8 also provides a masking system making it possible to verify that each of the destination terminal modules has properly received the information parameters sent by all of the source terminal modules. In FIG. 7, such masking would not be useful: if an information parameter coming from a source terminal module is not received (for example in the event of an information message being lost while being transferred to the network), then the destination terminal module can nevertheless still transmit an individual response parameter that makes sense even in the absence of any received information parameter; even if there is a fault during transfer of an information message in the go direction, or even of a response message in the return direction, the behavior of the source terminal module depends only on correctly receiving the individual response parameter. Typically, for a non-received bandwidth allocation request, no bandwidth is granted to the corresponding source terminal module, or for a non-received grant of authorized bandwidth, the source terminal module likewise assumes that no bandwidth has been granted. Any loss of a control message during mutual transfers thus has no effect on the overall behavior of the network, even though it is temporarily inconvenient for the source terminal module.

In FIG. 8, if an information parameter is not received by a destination terminal module, it generates its common response without taking account of the information parameter it has not received, and this can lead to the source terminal whose request has not been taken into account possibly interpreting the common response in an unsuitable manner. To mitigate that drawback, implementing a masking system in the embodiment of FIG. 8 implies using a symmetrical configuration of distributed functions in the go and return directions, at least concerning their modularity and allocation to terminal modules, so as to make it possible to process the masks described below in meaningful manner in the distributed functions.

In the "go" direction, the configuration is similar to that of FIG. 7 and is not described again in detail. The only difference in the go direction lies in generating a first mask in each distributed function. Each bit of the mask represents correct reception by the distributed function of an information message coming from a source terminal module. In this example, each distributed function receives information messages from 32 source terminal modules, and the mask may merely comprise 32 bits, one bit for each source terminal module. The value of the bit for a particular source terminal module indicates whether an information message has been correctly received from the corresponding source terminal module. This first mask is stored in the distributed function for use on subsequent reception of the response messages.

Furthermore, like the distributed functions, each destination terminal module generates a second mask, each bit of this mask representing correct reception by said destination terminal module of an information message coming from a distributed function. In this example, each destination terminal module receives information messages from 32 distributed functions, and the second mask can merely comprise 32 bits, one bit for each distributed function. The value of the bit for a particular distributed function indicates whether an information message has been correctly received from the corresponding distributed function. This second mask is then inserted in the common response message prepared by the destination terminal module for transmission to the distributed functions. In the return direction, the response parameters are common; in this example it is assumed that a common information parameter has a size of one byte. This common response parameter is associated with the second 32-bit mask, i.e. 4 bytes. The common response message can thus have a size of two segments. This message is transmitted to the 32 distributed functions that are allocated to the destination terminal module. This thus constitutes point-to-multipoint transfer of a two-segment common response message from each destination terminal to 32 distributed functions, as shown in FIG. 8.

A distributed function receives a common response message from each of the 32 destination terminal modules to which it is allocated; this message comprises firstly the common response parameter and secondly the second mask as generated by the destination terminal module. On examining the bit that corresponds to itself in the received mask, the distributed function can determine whether the destination terminal module from which the response message comes properly received the information message it previously sent thereto in the go direction, and can thus determine whether the destination terminal module was able to take account of the information parameters sent in the go direction.

The distributed function then regroups the common response parameters transmitted by the destination terminal modules. For 32 destination terminal modules each transmitting a common response parameter, there therefore exist 32 response parameters each occupying one byte, i.e. four segments. In addition, the distributed function prepares a third mask for transmitting to the source terminal modules, this third mask being generated firstly from the first mask which it previously generated and stored during transfer in the go direction, and secondly from the second mask it received from each destination terminal module. This third mask is representative of the fact that an information parameter transmitted by a source terminal module has been correctly received by the destination distributed function concerned, and to the fact that the new information message transmitted by said distributed function has likewise been correctly received by the destination terminal module. In addition, this third mask also makes it possible to validate correct reception of each response message coming from the destination terminal modules. Insofar as a distributed function is allocated to 32 source terminal modules, the third mask may merely present 32 bits; together the entire response message can thus be fitted into six segments.

Each source terminal module then receives a six-segment message from each of the 32 distributed functions allocated thereto. Each message coming from a distributed function comprises 32 common response parameters relating to the 32 destination terminal modules allocated to said distributed function, together with a mask in which each of the 32 bits indicates whether the mutual transfers of information parameters transmitted by the source terminal module in the go direction and of response parameters transmitted by the destination terminal modules in the return direction have taken place successfully.

The use of such a masking system enables a source terminal module to validate its interpretation of common response parameters as a function of whether or not the parameters it has exchanged with the destination terminal modules have been transferred properly. Naturally, if such protection against messages being lost is of no use, it is possible in the return direction merely to transmit the common response parameter, without making use of a masking system as in the embodiment of FIG. 8. Under such circumstances, it can be seen that an alternative solution consists in providing no distributed functions in the return direction since it suffices to transmit the common response parameters directly from the destination terminal modules using point-to-multipoint message transfer to all of the source terminal modules.

In the embodiment of FIG. 8, the additional volume of control message traffic for each terminal module is 32×9+ 1×2, i.e. 290 segments in transmission and 32×9+32×6, i.e. 480 segments in reception; for each distributed function, the control message traffic is 32×9+1×6, i.e. 294 segments in transmission, and 32×9+32×2, i.e. 352 segments in reception.

Using the above assumptions and for Tr=1 ms, the following values are obtained for control traffic volume expressed as a proportion of total data rate DT:

for each terminal module in transmission:

$OVHtm/t=290\times64/2.4\times10^6=0.77\%$ for each terminal module in reception:

$OVHtm/r=480\times64/2.4\times10^6=1.28\%$ for each distributed function in transmission:

$OVHicdf/t=294\times64/2.4\times10^6=0.78\%$ for each distributed function in reception:

$OVHicdf/r=352\times64/2.4\times10^6=0.94\%$

By comparison, when the second above-mentioned conventional approach with point-to-multipoint transfers, and still with N=1024, S=8, P=2 in the go direction and P=1 in the return direction, with Tr=1 ms, the additional volumes of control traffic at a terminal module in transmission (OVHtm/t) and in reception (OVHtm/r) would represent the following proportions of total data rate DT:

$OVHtm/t=10.005\times10^{-6}\times1024\times9/8\times Tr=1.15\%$ $OVHtm/r=53.3\times10^{-6}\times1024\times9/Tr=49\%$ Compared with that second approach, the invention thus makes it possible to achieve a further consideration reduction in additional traffic in reception.

If a masking system is not provided, the size of the common response messages transmitted by the distributed functions to the source terminal modules becomes five segments instead of six. Under such circumstances, the additional volume of control message traffic for each terminal module is 32×9+1×2, i.e. 290 segments in transmission, and 32×9+32×5, i.e. 448 segments in reception; for each distributed function, the control message traffic is 32×9+1× 5, i.e. 293 segments in transmission, and 32×9+32×2, i.e. 352 segments in reception. Using the same assumptions as above and with Tr=1 ms, the following values are obtained for control traffic volume expressed as a proportion of total data rate DT:

for each terminal module in transmission:

$OVHtm/t=290\times64/2.4\times10^6=0.77\%$ for each terminal module in reception:

$OVHtm/r=448\times64/2.4\times10^6=1.19\%$ for each distributed function in transmission:

$OVHicdf/t=293\times64/2.4\times10^6=0.78\%$ for each distributed function in reception:

$OVHicdf/r=352\times64/2.4\times10^6=0.94\%$

If no masking is provided and if the alternative solution is used which consists in not providing any distributed functions in the return direction, the size of the common response messages transferred directly in point-to-multipoint mode by each destination terminal module to all of the source terminal modules is two segments. Thus, the total volume of additional control message traffic for each terminal module is still 32×9+1×2, i.e. 290 segments in transmission, but becomes 32×9+1024×2, i.e. 2336 segments in reception; for each distributed function the control message traffic is only 32×9, i.e. 288 segments in transmission and in reception.

Using the above assumptions, and with Tr=1 ms, the following values are obtained for control traffic volume expressed as proportions of total data rate DT:

for each terminal module in transmission:

$OVHtm/t=290\times64/2.4\times10^6=0.77\%$ for each terminal module in reception:

$OVHtm/r=2336\times64/2.4\times10^6=6.24\%$ for each distributed function in transmission and in reception:

$OVHicdf/t=OVHicdf/r=288\times64/2.4\times10^6=0.76\%$

FIG. 9 is a diagram of mutual transfers of control messages via distributed functions of the invention using aggregated information parameters in the go direction and common response parameters in the return direction. In the FIG. 9 embodiment, in the go direction, the processing performed by the distributed function comprises aggregating information parameters relating to a given destination terminal module and coming from a plurality of source terminal modules so as to generate at least one global or "aggregated" parameter relating to each destination terminal module. In the example where each information parameter represents, as above, a request for bandwidth allocation for transmitting data through the network, as sent by each source terminal module to each destination terminal module, each distributed function need only transmit to a destination terminal module the sum of the bandwidth allocation requests formulated by the source terminal modules to which it is allocated, or else the average and/or the standard deviation of said requests. As a result, each destination terminal module can equally well generate in response a common parameter that takes account of the aggregated values of the bandwidth allocation requests as on the basis of the individual bandwidth allocation request values as mentioned above.

In the embodiment of FIG. 9, the same configuration is used for the various distributed functions as in the embodiments of FIGS. 7 and 8. As in the case of FIG. 8, each source terminal module thus transmits 32 9-segment information messages to the 32 distributed functions allocated thereto.

Each distributed function receives the information messages coming from the 32 source terminal modules. It separates the information parameters relating to each destination terminal module, and on the basis of those parameters it generates at least one global aggregated parameter relating to said destination terminal module; as explained above, this parameter may be, for example, a sum, or a mean calculated from the individual information parameter values it has received.

Each distributed function then transmits new information messages to the 32 destination terminal modules to which it is allocated, the new messages comprising the respective aggregated parameters as generated in this way. In the present example, it is assumed that the aggregated parameter presents a size of 2 bytes, like the information parameters transmitted by the source terminal modules. The new messages transmitted by the distributed function to each of the 32 modules can thus be information messages having a size of two segments. Each distributed function, as in the embodiment of FIG. 8, can also generate and store a first mask representing correct reception of the information parameter transmitted by each source terminal module.

Each destination terminal module receives from each of the 32 distributed functions which are allocated thereto a respective information message forwarding the aggregated parameter as generated by the distributed function. On the basis of the aggregated parameters received from the 32 distributed functions that are allocated thereto, each destination terminal module can generate a common response parameter, as in the case of FIG. 8, together with a second mask representing proper reception of the aggregated information parameter as transmitted by each of the distributed functions.

In the return direction, the common response parameters and the second mask can be transferred as explained with reference to FIG. 8.

As in the example of FIG. 8, it should be observed that if no masking system is provided, then the destination terminal modules can transfer these common information parameters directly to all of the source terminal modules in point-to-multipoint mode.

With the masking system as in the example of FIG. 8, the additional volume of control message traffic for each terminal module is 32×9+1×2, i.e. 290 segments in transmission, and 32×2+32×6, i.e. 256 segments in reception; for each distributed function, the control message traffic is 32×2+1×6, i.e. 70 segments in transmission, and 32×9+32×2, i.e. 352 segments in reception.

Using the same assumptions as above and with Tr=1 ms, the following values are obtained for control traffic volume expressed as a proportion of the total data rate DT:

for each terminal module in transmission:

$OVHtm/t=290\times64/2.4\times10^6=0.77\%$ for each terminal module in reception:

$OVHtm/r=256\times64/2.4\times10^6=0.68\%$ for each distributed function in transmission:

$OVHicdf/t=70\times64/2.4\times10^6=0.19\%$ for each distributed function in reception:

$OVHicdf/r=352\times64/2.4\times10^6=0.94\%$

By comparison, in the second above-mentioned conventional approach with point-to-multipoint transmission, and still with N=1024, S=8, P=2 in the go direction and P=1 in the return direction, and with Tr=1 ms, the additional volumes of control traffic at a terminal module in transmission (OVHtm/t) and in reception (OVHtm/r) will represent the following proportions of the total data rate DT:

$OVHtm/t=10.005\times10^{-6}\times1024\times9.8\times Tr=1.15\%$ $OVHtm/r=53.3\times10^{-6}\times1024\times9.8\times Tr=49\%$ Compared with that second approach, the invention achieves a further considerable reduction in additional traffic in reception.

If no masking is used, but if distributed functions are nevertheless used in the return direction, the size of the common response messages transferred in point-to-point mode by each distributed function to the source terminal modules is five segments instead of six. Under such circumstances, the additional volume of control message traffic for each terminal module is still 32×9+1×2, i.e. 290 segments in transmission, but becomes 32×2+32×5, i.e. 224 segments in reception; for each distributed function, the control message traffic is 32×2+1×5, i.e. 69 segments in transmission, and 32×9+32×2, i.e. 352 segments in reception.

Using the same assumptions as above and for Tr=1 ms, the following values are obtained for control traffic volume expressed as a proportion of total data rate DT:

for each terminal module in transmission:

$OVHtm/t=290\times64/2.4\times10^6=0.77\%$ for each terminal module in reception:

$OVHtm/r=224\times64/2.4\times10^6=0.60\%$ for each distributed function in transmission:

$OVHicdf/t = 69 \times 64/2.4 \times 10^6 = 0.18\%$ for each distributed function in reception:

$OVHicdf/r = 352 \times 64/2.4 \times 10^6 = 0.94\%$

FIG. 10 is a diagram of the mutual transfers of control messages via control functions of the invention using common response parameters in the return direction as in the examples of FIGS. 8 and 9, but for the case in which the destination control processes performed by the destination terminal modules in preceding FIGS. 7 to 9 are performed in this case by a "destination" function, with each destination function serving to process the destination control processes for a given group of destination terminal modules. The embodiment of FIG. 10 relies on the observation that the destination process which consists in each destination terminal module generating a common response parameter need not necessarily be performed locally in the corresponding destination terminal modules; by way of an alternative, the process can be offset and can be performed in a "destination" function which is allocated to said task for a given group of destination terminal modules.

As explained above with respect to intermediate functions, the term "function" as used herein for the destination functions is independent of the hardware implementation of the function, i.e. whether it is implemented in the form of intermediate servers connected to the network and dedicated to the distributed function, or whether it is implemented in the form of additional means added to certain terminal modules which then also act as an intermediate function.

A plurality of destination functions are provided, each being allocated to a set of destination terminal modules, and to a set of distributed functions. In the example of FIG. 10, a destination function is provided for each group of 32 destination terminal modules allocated to a set of 32 distributed functions. Using the same notation as above, an intermediate function ICDFi/j is allocated to 32 source terminal modules ITM(32×i−31) to ITM(32×i), and it transmits information messages to a destination function FDGMTj. The indexes i and j are integers and vary over the range 1 to 32.

A destination function FDGMTj is allocated to 32 intermediate functions ICDFi/j for i varying over the range 1 to 32, and is allocated to 32 destination terminal modules (OTM(32×j−31) to OTM(32×j). Each destination function knows the local parameters of the destination terminal modules to which it is allocated, and can consequently take the place of each of these destination modules in the destination processes of performing the calculations required for generating common response parameters on the basis of the aggregated information parameters generated and transmitted by the intermediate functions.

In other words, an intermediate function is allocated to a group of destination terminal modules which are represented in respect of this task by a destination function that acts on their behalf to perform these destination control processes.

The control parameter transfers are then performed as follows. Each source terminal module in the embodiments of FIGS. 7, 8, and 9, transmits information messages to the 32 intermediate functions allocated thereto.

Each intermediate function receives the messages from the 32 source terminal modules to which it is allocated; it processes the parameters it receives as in the example of FIG. 9, generating aggregated parameters for each destination terminal module. Unlike the example of FIG. 9, instead of transmitting the global parameters to the 32 destination terminal modules to which it is allocated, the intermediate function then transmits a new information message containing the 32 global parameters to the destination function which is responsible for representing the group of 32 destination terminal modules. The corresponding new message can then have a total size of nine segments when the global parameters have a size of 2 bytes.

From each of the 32 intermediate functions, any one destination function receives the aggregated parameters relating to the 32 destination terminal modules that it represents. Taking the place of each of these 32 destination terminal modules, the destination function can generate each of the 32 common response parameters, with this destination control process being similar to that generated in the example of FIG. 9; each common response parameter relating to a destination terminal module can have a size of one byte, as in the preceding example. The destination function can also generate a second mask indicating whether it has properly received information messages coming from the 32 intermediate functions. As in the preceding cases, such a mask has a size of 32 bits.

In the return direction, the destination function then transmits a response message in point-to-multipoint mode to all of the intermediate functions that are allocated thereto, said response message comprising the common response parameters calculated for the 32 destination terminal modules, together with the second mask. This message has a size of six segments, i.e. a header segment, four segments of transporting the 32 bytes of the common response parameters and one segment for transporting the 4 bytes of the mask.

Each intermediate function receives this response message from the destination function representing the 32 destination terminal modules to which it is allocated. It then has common response parameters for each of the destination terminal modules and the associated second mask. It can then proceed as explained with reference to FIG. 8 and transmit the common response parameters in point-to-multipoint mode to all of the source terminal modules to which it is allocated, said parameters relating to said 32 destination terminal modules.

Finally, each source terminal module receives the common response parameters from the 32 distributed functions which are allocated thereto, together with the masks, as explained with reference to FIG. 8. In the embodiment of FIG. 10, the additional volume of control message traffic for each terminal module is 32×9, i.e. 288 segments in transmission, and 32×6, i.e. 192 segments in reception. For each distributed function, the control message traffic is 1×9+1×6, i.e. 15 segments in transmission, and 32×9+1×6, i.e. 294 segments in reception. For each destination function, the control message traffic is six segments in transmission and 32×9, i.e. 288 segments in reception.

Using the same assumptions as above and for Tr=1 ms, the following values are obtained for the volume of control traffic expressed as a proportion of total data rate DT:

for each terminal module in transmission:

$OVHtm/t = 288 \times 64/2.4 \times 10^6 = 0.77\%$ for each terminal module in reception:

$OVHtm/r = 192 \times 64/2.4 \times 10^6 = 0.51\%$ for each distributed function in transmission:

$OVHicdf/t = 15 \times 64/2.4 \times 10^6 = 0.04\%$ for each distributed function in reception:

$OVHicdf/r = 294 \times 64/2.4 \times 10^6 = 0.79\%$ for each destination function in transmission:

$$OVHt/fdgmt/t = 6 \times 64/2.4 \times 10^6 = 0.02\%$$

for each destination function in reception:

$$OVHt/fdgmt/r = 288 \times 64/2.4 \times 10^6 = 0.77\%$$

FIG. 11 is a diagram similar to that of FIG. 10, but without using masks. In the embodiment of FIG. 11, no masks are generated in the go direction in the intermediate functions, nor are any masks generated in the destination functions. In the return direction, the common response parameters are transmitted directly in point-to-multipoint mode from the destination functions to all of the source terminal modules. In this case, these common response messages have a size of five segments since no mask is transmitted.

In the embodiment of FIG. 11, the additional volume of control message traffic for each terminal module is 32×9, i.e. 288 segments in transmission, and 32×5, i.e. 160 segments in reception. For each distributed function, the control message traffic is 1×9 segments in transmission and 32×9, i.e. 288 segments in reception. For each destination function, the control message traffic is 1×5 segments in transmission, and 32×9, i.e. 288 segments in reception.

Using the same assumptions as above and for Tr=1 ms, the following values are obtained control traffic volume expressed as a proportion of total data rate DT:

for each terminal module in transmission:

$$OVHtm/t = 288 \times 64/2.4 \times 10^6 = 0.77\%$$

for each terminal module in reception:

$$OVHtm/r = 160 \times 64/2.4 \times 10^6 = 0.43\%$$

for each distributed function in transmission:

$$OVHicdf/t = 9 \times 64/2.4 \times 10^6 = 0.02\%$$

for each distributed function in reception:

$$OVHicdf/r = 288 \times 64/2.4 \times 10^6 = 0.77\%$$

for each destination function in transmission:

$$OVHt/fdgmt/t = 5 \times 64/2.4 \times 10^6 = 0.013\%$$

for each destination function in reception:

$$OVHt/fdgmt/r = 288 \times 64/2.4 \times 10^6 = 0.77\%$$

Possible embodiments of the distributed functions are described in detail below. As mentioned above, their physical locations, and indeed the physical locations of the destination functions, can be designed in the form of intermediate server modules connected to the network and dedicated by distributed function (and/or destination function), or else in the form of additional means added to certain terminal modules which then act also as a distributed function (and/or a destination function). In the description below, an implementation of the distributed functions is described for the go direction. Their implementation in the return direction is similar.

A first solution for implementing the distributed functions consists in using a software solution in a processor (a microprocessor, a microcontroller, etc.). Such a software solution implies associating an inlet/outlet interface to the processor which is adapted to the control message transmission protocol (for information in the go direction).

In the embodiment of FIGS. 4, 7, and 8, the processing comprises a step of separating the parameters transmitted by the incoming terminal modules MTE, and then a step of regrouping these parameters as a function of the outgoing terminal module MTS to which they relate. For this purpose, the processor receives these messages and stores the control parameters they contain (information in the go direction) in a data table. Each location in the data table corresponds to an order parameter "i,j" where i represents the order or index of an MTE from which the message has been received (source terminal module in the go direction), and where j represents the index of an MTS to which a message is to be transmitted (destination terminal module in the go direction). After receiving the various control messages, the processor groups together the control parameters of order j stored in the data table to assemble in succession each new control message for transmission.

In the embodiment of FIGS. 9 to 11, the processing comprises separating control parameters (information parameters in the go direction) in the received messages, a step of regrouping these parameters as a function of the MTS (destination terminal module in the go direction), and a step of calculating an aggregated global parameter relating to the MTS. Alternatively, equivalent processing could consist in calculating each aggregated parameter incrementally on receiving each control message. For example, when aggregation is performed by summing, the processor manages a data table in which each location corresponds to a current aggregated parameter of order "j" where j represents the index of an MTS to which a message is to be transmitted (destination terminal module in the go direction). When a message is received, the processor updates the data table by selecting each current aggregated parameter of order "j" stored in the data table, adding the value of said current parameter to the value of each control parameter of order j (information parameter in the go direction), and then storing the result of the addition as the new value for the current aggregated parameter of order j. After receiving the various control messages, the processor has the value for each aggregated parameter of order j in the corresponding locations of the data table, and it uses these values for generating in succession each new control message for transmission.

For each new message to be transmitted, the processor prepares the header segment by placing appropriate routing information therein, i.e., in the go direction, the address of the destination terminal module, or in the example of FIG. 10 or 11, the address of the destination function, and in the return direction, the address of the source terminal module(s). The control parameters for transmission are placed in the following segments of the new message. Such a software solution is simple to implement but may not be fast enough for very short periods Tr, e.g. periods of millisecond order.

FIG. 12 is a diagram of a hardware implementation of a distributed function when the processing is processing to separate and regroup parameters. Such a hardware embodiment makes it possible to obtain shorter processing times for applications that use a large number of messages to be processed during periods Tr that are very short. The device of FIG. 12 is described below for processing information parameters in the go direction. The device has a serial-to-parallel inlet register 1 which has a serial inlet on which it receives the information messages coming from the source terminal modules, and it outputs the segments of the message on a parallel outlet. The header segment is delivered to a message reception controller 3, while the following segments containing the information parameters are delivered to the inlet of a message storage and conversion device 5. The message reception controller 3 serves to cause the received parameters to be written into the storage and conversion device 5, as represented by write-enable arrow 7.

The message storage and conversion device 5 is a memory optimized for the processing performed by the distributed function, having a parallel inlet and a parallel outlet, but in which writing takes place along memory rows while reading takes place along memory columns. In the embodiment described, it is assumed that all S segments of a message containing parameters are written in a single overall write operation (an alternative solution would consist, for example, in performing a separate write operation for each received segment). For each operation of writing message parameters, the message reception controller 3 determines the address of the memory row required as a function of the address of the terminal module which transmitted the message. If the parameters contained in the messages generated by the various source terminal modules are placed in an identical order, e.g. increasing order of destination terminal module identity, it suffices to introduce the parameters of each received message directly into the row of the storage device 5 corresponding to the source terminal module of order $i$ which transmitted the message, with it being possible subsequently to read the parameters relating to a destination terminal module of given order $j$ directly from the corresponding column of the storage device when a new information message is to be transmitted.

For this purpose, the device of FIG. 12 further comprises a message transmission controller 9. The function of this controller is to cause the information parameters contained in the storage column corresponding to the relevant destination terminal module to be read from the storage and conversion device 5 each time a new information message is to be transmitted, as represented by read-enable arrow 11 in FIG. 12. The message transmission controller 9 also generates the header segment containing the routing information as a function of the identity of the destination terminal module corresponding to the column that has been read, as represented by arrow 13.

The multiplexer 15 receives both the content of the column as read from the storage and conversion device 5 and the header segment as generated by the message transmission controller 9, and it outputs the content of the new message which is applied to a parallel inlet of an outlet register 17 having a parallel inlet and a serial outlet. The output from this register delivers the message ready for transmission.

FIG. 13 is a hardware implementation diagram for a distributed function when the processing is aggregation processing, e.g. summing information parameters. As in FIG. 12, a serial-in and parallel-out register 20 is typically used, together with a parallel-in and serial-out register 21, a message reception controller 22, and a message transmission controller 23. In the example of the solution described, it is assumed that the parameters contained in the messages generated by the various source terminal modules are placed in identical order, for example in order of increasing destination terminal module identity. The summing processing can be performed by calculating each aggregated parameter progressively on receiving each control message. For this purpose, the parameter summing register 24 of FIG. 13 is used which stores the Q values of the current aggregated parameter of order "j", where $j$ represents the index of a destination terminal module. A set 25 of Q adders is also used, one adder for each of the Q parameters relating to the Q destination terminal modules of order $j$. For each parameter of order $j$, the corresponding adder $25j$ receives the parallel outlet $26j$ from the inlet register 20 on a first inlet and the parallel outlet $27j$ from the summing register 25 on a second inlet, and it outputs the result of the addition which is connected to the parallel inlet $28j$ of the register 24 corresponding to said parameter.

When a message is received, Q additions are thus performed in parallel between the Q current aggregated parameter values stored in the summing register 24 and the respective Q information parameter values received in the inlet register 20, and then the outlet register 25 is updated by writing the results of the Q adders therein as the new accumulated values of the Q current aggregated parameters. After receiving the various control messages, the parameter-summing register 24 contains the final values of each of the Q aggregated parameters of order $j$. The message transmission controller 23 then causes new information messages to be generated for transmission by associating one or more aggregated parameters of the register 24 with a header segment containing routing information as a function of the identity of the destination terminal module concerned (or in the examples of FIG. 10 or 11, the address of the destination function), with each new assembled message being supplied to the inlet of the parallel-in serial-out outlet register 21. Other variant embodiments are possible using a smaller number of adders (or even a single adder), with any given adder being used successively for a plurality of parameters whenever a message is received.

Naturally, the present invention is not limited to the embodiments and examples described and shown, but can be varied in numerous ways by the person skilled in the art. In the example of FIG. 4, the messages received by the distributed function from the source terminal modules, and the message transmitted by the distributed function to the destination terminal modules present exactly the same structure. This is not essential for implementing the invention, and it is possible to imagine using some different number of segments, for example.

The examples of FIGS. 7 to 11 can be generalized to other cardinal numbers of sets of terminal modules, or to other schemes for allocating intermediate functions or destination functions. It is possible to use hardware or software implementations other than those described above.

In the examples of FIGS. 7 to 11, it is assumed in the go direction that point-to-point transmission is performed between the source terminal modules and the distributed functions, between the distributed functions and the destination terminal modules, and between the distributed functions and the destination functions; depending on the number of distributed functions and on the size of the information parameters it would also be possible to use full or partial point-to-multipoint transmission. Thus, compared with the embodiments proposed, it would be possible to concatenate the message or some of them. The same applies in the return direction.

The invention claimed is:

1. A method of mutually transferring control parameters between terminal modules interconnected by a communications network transferring data from "source" terminal modules to "destination" terminal modules, "information" control parameters being transferred from the source terminal modules to the destination terminal modules by means of dedicated information messages, each source terminal module transferring to a plurality of destination terminal modules at least one information parameter relating to each of the destination terminal modules;

the method being characterized in that the mutual transfers of information messages between terminal modules take place by means of "distributed" functions, in that a distributed function is allocated to a set of destination terminal modules and to a set of source terminal modules, and in that the method comprises the steps of:

a source terminal module generating at least one dedicated information message comprising information parameters relating to the destination terminal modules of each associated distributed function which is allocated to said source terminal module;

transmitting each information message from the said source terminal module to said corresponding distributed function;

each distributed function receiving information messages coming from a plurality of source terminal modules to which the distributed function is allocated;

each distributed function processing the information parameters of the received information messages, said parameters relating to the source terminal modules and to the destination terminal modules to which the function is allocated; and each distributed function generating and transmitting at least one information message comprising the results of the processing of said information parameters.

2. A method according to claim 1, wherein the processing performed by the distributed function comprises separating the information parameters relating to a plurality of destination terminal modules and coming from a single source terminal module, and regrouping information parameters relating to a single destination terminal module and coming from different source terminal modules in at least one new information message, and the method further comprises the step of each destination module receiving at least one information message from each of the distributed functions with which the destination module is associated.

3. A method according to claim 1, characterized in that the processing performed by the distributed function comprises aggregating information parameters relating to a single destination terminal module and coming from a plurality of source terminal modules, so as to generate at least one aggregated parameter relating to each destination terminal module.

4. A method according to claim 3, characterized in that the generating and transmitting step performed by the distributed function comprises transmitting at least one information message to each destination terminal module with which the distributed function is associated, and the method further comprises a step of each destination terminal module receiving at least one information message transporting at least one aggregated parameter coming from each of the distributed functions with which the destination terminal module is associated.

5. A method according to claim 3, characterized in that the mutual transfers of information messages between terminal modules further takes place via destination functions; in that a destination function is allocated to a set of destination terminal modules and to a set of distributed functions; in that each destination function takes the place of said set of destination terminal modules for the purpose of performing the final reception operations on information messages; in that the generating and transmission step performed by the distributed functions comprises transmitting at least one new information message to at least one destination function, and in that the method further comprises a step of each destination function receiving information messages transporting at least one aggregated parameter coming from the distributed functions to which the destination function is allocated.

6. A method according to claim 2, wherein the method comprises mutual transfers of "response" control parameters in dedicated response messages generated by each of the destination terminal modules and sent to the source terminal modules, each destination terminal generating at least one response message comprising at least one response parameter; in that the response message transfers generated by the destination terminal modules to the source terminal modules also take place via associated distributed functions; and in that the method comprises the steps of:

the destination terminal module generating and transmitting to each of the associated distributed functions at least one response message to be sent to a plurality of source terminal modules;

each distributed function receiving response messages coming from a plurality of destination terminal modules to which the distributed function is allocated;

the distributed function processing response messages coming from different destination terminal modules;

the distributed function generating and transmitting to the source terminal modules to which the distributed function is allocated at least one new response message regrouping the response parameters; and each of said source terminal modules receiving response parameters relating to a plurality of destination terminal modules in the response messages transmitted by each associated distributed function.

7. A method according to claim 6, characterized in that each response message transmitted by a destination terminal module comprises, for each source terminal module, at least one individual response parameter per source terminal module; and in that the processing step evaluated by the distributed function consists in separating the individual response parameters for a plurality of source terminal modules in each received response message and in regrouping individual response parameters relating to a single source terminal module and coming from different destination terminal modules in at least one new response message.

8. A method according to claim 6, characterized in that each response message transmitted by a destination terminal module comprises at least one common response parameter that is identical for all of the source terminal modules; and in that the processing step performed by the distributed function consists in regrouping common response parameters coming from different destination terminal modules in at least one new response message.

9. A method according to claim 5, wherein the method comprises mutual transfers of "response" control parameters in dedicated response messages each generated by said destination functions for sending to the source terminal modules; and in that a destination function also takes the place of the destination terminal modules of said set for further performing a step of generating at least one common response parameter that is identical for all of the source terminal modules for each of the terminal modules of said set, a step of generating at least one common response message comprising at least one common response parameter relating to each of the destination terminal modules of said set, and a step of transmitting said messages to the source terminal modules.

10. A method according to claim 9, characterized in that a destination function transmits at least one common response message directly to the source terminal modules, and in that the method further comprises a step in which each of said source terminal modules receives common response parameters relating to a plurality of destination terminal modules in the response messages transmitted by each destination function.

11. A method according to claim 9, characterized in that the transfers of response messages from the destination functions to the source terminal modules take place via distributed functions, a destination function transmitting at least one common response message to the distributed function to which the destination function is allocated; and in that the method further comprises the steps of:

each of said associated distributed functions receiving at least one common response message coming from the destination function to which the distributed function is allocated;

a distributed function performing processing consisting in redistributing each common response message to the source terminal modules;

a distributed function generating and transmitting each common response message to the source terminal modules to which the distributed function is allocated; and each of said source terminal modules receiving common response parameters relating to a plurality of destination terminal modules in the response messages transmitted by each associated distributed function.

12. A method according to claim 8, in which in order to maintain coherence between the common response parameters received by the source terminal modules relative to the information parameters they have transmitted, while providing protection against the possibility of messages being lost while they are being transferred through the communications network, the method is characterized in that said step of processing the information parameters by means of a distributed function also comprises an operation of storing in the distributed function a binary flag per source terminal module specifying whether the function has properly received an information message from said source terminal module; in that said step of receiving information messages in a destination terminal module also comprises an operation of storing in the destination terminal module a binary flag per distributed function specifying whether an information message has been properly received from said distributed function; in that said step of generating a response message in a destination terminal module also comprises an operation of incorporating in each response message a binary flag per distributed function involved specifying, on the basis of the locally stored flags, whether or not said destination terminal module has properly received an information message coming from said distributed function; and in that said step of a distributed function processing response parameters further comprises an operation of incorporating in each response message sent to a source terminal module, a binary flag per destination terminal module specifying whether or not each response parameter corresponding to said destination terminal module is valid, validation depending firstly on the binary flags received by the distributed function in the response messages, and also on the binary flags stored locally in the distributed function.

13. A method according to claim 11, in which in order to maintain coherence between the common response parameters received by the source terminal modules relative to the information parameters the source terminal modules have transmitted, while providing protection against the possibility of messages being lost while the messages are being transferred through the communications network, the method is characterized in that said step of processing information parameters in a distributed function also comprises an operation of storing in the distributed function a binary flag per source terminal module specifying whether the distributed function has properly received an information message from said source terminal module; in that said step of receiving information messages in a destination function also comprises an operation of storing in the destination function a binary flag per distributed function specifying whether destination function has properly received an information message from said distributed function; in that said step of generating a response message in a destination function also comprises an operation of incorporating in each response message a binary flag per distributed function concerned specifying, on the basis of locally stored flags, whether said destination function has properly received an information message coming from said distributed function; and in that said step of processing response parameters by a distributed function also comprises an operation of incorporating in each response message for sending to a source terminal module a binary flag per destination terminal module specifying whether each response parameter corresponding to said destination terminal module is valid, validation depending firstly on the binary flags received by the distributed function in the response messages and secondly on the binary flags stored locally in the distributed function.

14. A method according to claim 8, characterized in that the response messages transporting identical common parameters for all of the source terminal modules are identical messages, and in that they are transferred on a point-to-multipoint basis when they are transited to a plurality of destinations.

15. A method according to claim 7, characterized in that each source terminal module transmits information parameters in an information message, the parameters relating to each of the destination terminal modules, each information parameter characterizing the volume of data traffic that a source terminal module seeks to transmit to a destination terminal module; and in that each destination terminal module, or each destination function taking the place thereof, transmits in a response message response parameters relating to each of the destination terminal modules, each response parameter enabling each source terminal to determine the volume of data traffic which the source terminal is authorized to transmit to a destination terminal module.

16. A method according to claim 1, characterized in that said distributed functions are implemented using additional means introduced in at least some of the terminal modules which then also act as respective distributed functions, and in that each terminal module which generates control messages for at least one distributed function also knows the identity of each terminal module taking on the role of each given distributed function, thus enabling said messages to be addressed to the appropriate distributed functions.

17. A method according to claim 1, characterized in that said destination functions are implemented using additional means introduced in at least some of the terminal modules which then also act as respective destination functions; and in that each distributed function which generates control messages for at least one destination function also knows the identity of each terminal module taking on the role of each destination function, thus enabling said messages to be addressed to the appropriate destination functions.

18. The method according to claim 1, wherein said information control parameters comprise at least one of broadband allocation request parameters and broadband allocation grant parameters.

* * * * *